United States Patent
Muller et al.

(10) Patent No.: US 10,614,927 B2
(45) Date of Patent: Apr. 7, 2020

(54) STORING HAZARDOUS MATERIAL IN A SUBTERRANEAN FORMATION

(71) Applicant: Deep Isolation, Inc., Berkeley, CA (US)

(72) Inventors: Richard A. Muller, Berkeley, CA (US); Elizabeth Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 0 days.

(21) Appl. No.: 16/430,005

(22) Filed: Jun. 3, 2019

(65) Prior Publication Data
US 2019/0318838 A1    Oct. 17, 2019

Related U.S. Application Data

(63) Continuation of application No. 15/897,481, filed on Feb. 15, 2018, now abandoned, which is a
(Continued)

(51) Int. Cl.
*G21F 9/36* (2006.01)
*G21F 9/34* (2006.01)
(Continued)

(52) U.S. Cl.
CPC ............... *G21F 9/34* (2013.01); *B09B 1/00* (2013.01); *B09B 1/008* (2013.01); *E21B 43/00* (2013.01);
(Continued)

(58) Field of Classification Search
CPC .................... G21F 9/34; B09B 1/008
See application file for complete search history.

(56) References Cited

U.S. PATENT DOCUMENTS 3,899,631 A * 8/1975 Clark ............... E21B 17/003
174/47
4,708,522 A * 11/1987 Bergman ............. G21F 9/34
376/272
(Continued)

FOREIGN PATENT DOCUMENTS

GB    2151839 A  *  7/1985  ............ G21F 9/24
GB    2151839 A       7/1985
(Continued)

OTHER PUBLICATIONS

Performance Confirmation Concepts Study Report Civilian Radioactive Waste Management System Management & Operating Contractor TRW 1996*
(Continued)

*Primary Examiner* — Janine M Kreck
(74) *Attorney, Agent, or Firm* — Fish & Richardson P.C.

(57) ABSTRACT

A hazardous material storage bank includes a wellbore extending into the Earth and including an entry at least proximate a terranean surface, the wellbore including a substantially vertical portion, a transition portion, and a substantially horizontal portion; a storage area coupled to the substantially horizontal portion of the well bore, the storage area within or below a shale formation, the storage area vertically isolated, by the shale formation, from a subterranean zone that includes mobile water; a storage container positioned in the storage area, the storage container sized to fit from the wellbore entry through the substantially vertical, the transition, and the substantially horizontal portions of the wellbore, and into the storage area, the storage container including an inner cavity sized enclose hazardous material; and a seal positioned in the wellbore, the seal isolating the storage portion of the wellbore from the entry of the wellbore.

30 Claims, 15 Drawing Sheets

Related U.S. Application Data continuation of application No. 14/998,232, filed on Dec. 24, 2015, now Pat. No. 10,002,683.

(51) Int. Cl.
| | |
|---|---|
| *G21F 5/008* | (2006.01) |
| *B09B 1/00* | (2006.01) |
| *G21F 9/16* | (2006.01) |
| *E21B 43/00* | (2006.01) |
| *G21F 9/30* | (2006.01) |
| *E21B 41/00* | (2006.01) |

(52) U.S. Cl.
CPC .............. *G21F 5/008* (2013.01); *G21F 9/165* (2013.01); *G21F 9/304* (2013.01); *E21B 41/005* (2013.01)

(56) References Cited

U.S. PATENT DOCUMENTS

| | | | |
|---|---|---|---|
| 5,165,235 A | 11/1992 | Nitschke | |
| 5,340,235 A | 8/1994 | Milliken | |
| 5,377,104 A | 12/1994 | Sorrells et al. | |
| 5,387,741 A | 2/1995 | Shuttle | |
| 5,850,614 A | 12/1998 | Crichlow | |
| 5,863,283 A | 1/1999 | Gardes | |
| 6,238,138 B1* | 5/2001 | Crichlow | G21F 9/34 405/129.35 |
| 7,068,748 B2 | 6/2006 | Singh | |
| 7,287,934 B2* | 10/2007 | Okutsu | B09B 1/00 405/129.5 |
| 8,933,289 B2 | 1/2015 | Crichlow | |
| 9,852,822 B2 | 12/2017 | Singh | |
| 10,002,683 B2* | 6/2018 | Muller | B09B 1/00 |
| 10,265,743 B1* | 4/2019 | Muller | B09B 1/006 |
| 10,315,238 B1* | 6/2019 | Muller | G21F 9/36 |
| 10,446,287 B2 | 10/2019 | Singh | |
| 2002/0020528 A1 | 2/2002 | McCabe et al. | |
| 2005/0207525 A1 | 9/2005 | Singh | |
| 2008/0308271 A1* | 12/2008 | Chouzenoux | E21B 47/122 166/250.02 |
| 2010/0105975 A1 | 4/2010 | Baird | |
| 2011/0005762 A1 | 1/2011 | Poole | |
| 2018/0144841 A1 | 5/2018 | Singh | |
| 2018/0345336 A1 | 12/2018 | Muller et al. | |
| 2019/0099790 A1 | 4/2019 | Muller et al. | |

FOREIGN PATENT DOCUMENTS

| | | |
|---|---|---|
| WO | WO92007667 | 5/1992 |
| WO | WO2015069300 | 5/2015 |
| WO | WO 2016/177876 | 11/2016 |

OTHER PUBLICATIONS

[No Author] World Nuclear News, "Yucca Mountain cost estimate rises to $96 billion", Aug. 6, 2008, 2 pages, ISSN 2040-5766.

Bill W. Arnold, et al., "Reference Design and Operations of Deep Borehole Disposal of High-Level Radioactive Waste," Sandia National Laboratories (2011) ("Sandia Report") (available at: http://prod.sandia.gov/techlib/access-control.cgi/2011/116749.pdf).

Christopher Ian Hoag, "Canister Design for Deep Borehole Disposal of Nuclear Waste," Massachusetts Institute of Technology, May 2006 (pp. 1-6).

Cornwall, W., "Deep Sleep. Boreholes drilled into Earth's crust get a fresh look for nuclear waste disposal," Science, vol. 349, Issue 6244, Jul. 10, 2015, 132-35.

Faybishenko et al., Editors, Lawrence Berkeley National Laboratory and Sandia National Laboratories: "International Approaches for Deep Geological Disposal of Nuclear Waste: Geological Challenges in Radioactive Waste Isolation", prepared for the US Department of Energy, Fifth Worldwide Review—2016, 474 pages.

Frances Elizabeth Dozier, "Feasibility of Very Deep Borehole Disposal of US Nuclear Defense Wastes," Massachusetts Institute of Technology, Sep. 2011 (pp. 1-12).

Hiroki Sone and Mark D. Zoback, "Mechanical properties of shale-gas reservoir rocks—Part 1:Static and dynamic elastic properties and anisotropy," Geophysics, vol. 78, No. 5, Sep. Oct. 2013, D381-92.

International Search Report and Written Opinion issued in International Application No. PCT/US2016/066539, dated Apr. 19, 2017, 13 pages.

J. Winterle et al., Regulatory Perspectives on Deep Borehole Disposal Concepts, prepared for the U.S. Nuclear Regulatory Commission, Contract NRC-02-07006, Center for Nuclear Waste Regulatory Analyses, San Antonio, TX, May 2011, 24 pages.

Johnathan Sutton Gibbs, "Feasibility of Lateral Emplacement in Very Deep Borehole Disposal of High Level Nuclear Waste" master's thesis, Massachusetts Institute of Technology (2010) ("Gibbs") (available at: https://dspace.mit.edu/handle/1721.1/63242), 2 pages.

Neuzil et al., "Shale: An overlooked option forUS nuclear waste disposal," Bulletin of the Atomic Scientists Nov. 2014, Retrieved from the Internet: http://thebulletin .org/shale-overlooked-option-us-nuclear-waste-disposal7831 printed Sep. 26, 2016, 5 pages.

U.S. Nuclear Waste Technical Review Board, A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel (2015) ("NWTRB") (available at: http://www.nwtrb.gov/reports/disposal_options.pdf).

Vartabedian, Ralph; "Decades-old war over Yucca Mountain nuclear dump resumes under Trump budget plan", Mar. 29, 2017, ralph. vartabdian@latimes.com; twitter @rvartabedian; 4 pages.

YuccaMountain.org; Eureka County, Nevada—Nuclear Waste Office, FAQ, Eureka County Home, last updated Mar. 17, 2017; 12 pages.

Gibb et al., "A Model for Heat Flow in Deep Borehole Disposals of High-Level Nuclear Waste," Journal of Geophysical Research, vol. 113, dated May 6, 2008, 18 pages.

Neuzil, "Can Shale Safely Host U.S. Nuclear Waste?" EOS. vol. 94, No. 30, Dated Jul. 23, 2013, 3 pages.

PCT Notification of Transmittal of the International Search Report and Written Opinion in International Application No. PCT/US2018/035974, dated Aug. 24, 2018, 13 pages.

* cited by examiner

640

642
Forming the wellbore from the terranean surface to the shale formation

644
Installing a casing in the wellbore that extends from at or proximate the terranean surface, through the wellbore, and into the storage area

646
Cementing the casing to the wellbore

648
Producing hydrocarbon fluid from the shale formation, through the wellbore, and to the terranean surface

650
Shutting in the wellbore

FIG. 6B

STORING HAZARDOUS MATERIAL IN A SUBTERRANEAN FORMATION

CROSS-REFERENCE TO RELATED APPLICATION

This application is a continuation of, and claims priority under 35 U.S.C. § 120 to, U.S. patent application Ser. No. 15/897,481, entitled "Storing Hazardous Material in a Subterranean Formation" and filed on Feb. 15, 2018, which in turn is a continuation of, and claims priority under 35 U. S. C. § 120 to, U.S. patent application Ser. No. 14/998,232, now U.S. Pat. No. 10,002,683, entitled "Storing Hazardous Material in a Subterranean Formation" and filed on Dec. 24, 2015. The entire contents of both prior applications are hereby incorporated by reference.

TECHNICAL FIELD

This disclosure relates to storing hazardous material in a subterranean formation and, more particularly, storing spent nuclear fuel in a subterranean formation.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the Yucca Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In a general implementation, a hazardous material storage bank includes a wellbore extending into the Earth and including an entry at least proximate a terranean surface, the wellbore including a substantially vertical portion, a transition portion, and a substantially horizontal portion; a storage area coupled to the substantially horizontal portion of the well bore, the storage area within or below a shale formation, the storage area vertically isolated, by the shale formation, from a subterranean zone that includes mobile water; a storage container positioned in the storage area, the storage container sized to fit from the wellbore entry through the substantially vertical, the transition, and the substantially horizontal portions of the wellbore, and into the storage area, the storage container including an inner cavity sized enclose hazardous material; and a seal positioned in the wellbore, the seal isolating the storage portion of the wellbore from the entry of the wellbore.

In an aspect combinable with the general implementation, the storage area is formed below the shale formation and is vertically isolated from the subterranean zone that includes mobile water by the shale formation.

In another aspect combinable with any of the previous aspects, the storage area is formed within the shale formation, and is vertically isolated from the subterranean zone that includes mobile water by at least a portion of the shale formation.

In another aspect combinable with any of the previous aspects, the shale formation includes a permeability of less than about 0.001 millidarcys.

In another aspect combinable with any of the previous aspects, the shale formation includes a brittleness of less than about 10 MPa, where brittleness includes a ratio of compressive stress of the shale formation to tensile strength of the shale formation.

In another aspect combinable with any of the previous aspects, the shale formation includes a thickness proximate the storage area of at least about 100 feet.

In another aspect combinable with any of the previous aspects, the shale formation includes a thickness proximate the storage area that inhibits diffusion of the hazardous material that escapes the storage container through the shale formation for an amount of time that is based on a half-life of the hazardous material.

In another aspect combinable with any of the previous aspects, the shale formation includes about 20 to 30% weight by volume of clay or organic matter.

In another aspect combinable with any of the previous aspects, the hazardous material includes spent nuclear fuel.

Another aspect combinable with any of the previous aspects further includes at least one casing assembly that extends from at or proximate the terranean surface, through the wellbore, and into the storage area.

In another aspect combinable with any of the previous aspects, the storage container includes a connecting portion configured to couple to at least one of a downhole tool string or another storage container.

In another general implementation, a method for storing hazardous material includes moving a storage container through an entry of a wellbore that extends into a terranean surface, the entry at least proximate the terranean surface, the storage container including an inner cavity sized enclose hazardous material; moving the storage container through the wellbore that includes a substantially vertical portion, a transition portion, and a substantially horizontal portion, the storage container sized to fit from the wellbore entry through the substantially vertical, the transition, and the substantially horizontal portions of the wellbore; moving the storage container into a storage area that is coupled to the substantially horizontal portion of the well bore, the storage area located within or below a shale formation and vertically isolated, by the shale formation, from a subterranean zone that includes mobile water; and forming a seal in the wellbore that isolates the storage portion of the wellbore from the entry of the wellbore.

In an aspect combinable with the general implementation, the storage area is formed below the shale formation and is vertically isolated from the subterranean zone that includes mobile water by the shale formation.

In another aspect combinable with any of the previous aspects, the storage area is formed within the shale formation.

In another aspect combinable with any of the previous aspects, the shale formation is geologically formed below an impermeable formation that is formed between the shale formation and the subterranean zone that includes mobile water.

In another aspect combinable with any of the previous aspects, the shale formation includes geological properties including two or more of: a permeability of less than about 0.001 millidarcys; a brittleness of less than about 10 MPa, where brittleness includes a ratio of compressive stress of the shale formation to tensile strength of the shale formation; a thickness proximate the storage area of at least about 100 feet; or about 20 to 30% weight by volume of organic material or clay.

In another aspect combinable with any of the previous aspects, the hazardous material includes spent nuclear fuel.

In another aspect combinable with any of the previous aspects, the wellbore further includes at least one casing that extends from at or proximate the terranean surface, through the wellbore, and into the storage area.

Another aspect combinable with any of the previous aspects further includes prior to moving the storage container through the entry of the wellbore that extends into the terranean surface, forming the wellbore from the terranean surface to the shale formation.

Another aspect combinable with any of the previous aspects further includes installing a casing in the wellbore that extends from at or proximate the terranean surface, through the wellbore, and into the storage area.

Another aspect combinable with any of the previous aspects further includes cementing the casing to the wellbore.

Another aspect combinable with any of the previous aspects further includes, subsequent to forming the wellbore, producing hydrocarbon fluid from the shale formation, through the wellbore, and to the terranean surface.

Another aspect combinable with any of the previous aspects further includes removing the seal from the wellbore; and retrieving the storage container from the storage area to the terranean surface.

Another aspect combinable with any of the previous aspects further includes monitoring at least one variable associated with the storage container from a sensor positioned proximate the storage area; and recording the monitored variable at the terranean surface.

In another aspect combinable with any of the previous aspects, the monitored variable includes at least one of radiation level, temperature, pressure, presence of oxygen, presence of water vapor, presence of liquid water, acidity, or seismic activity.

Another aspect combinable with any of the previous aspects further includes, based on the monitored variable exceeding a threshold value: removing the seal from the wellbore; and retrieving the storage container from the storage area to the terranean surface.

In another general implementation, a spent nuclear fuel storage system includes a directional wellbore formed from a terranean surface, through a first subterranean layer, and into a second subterranean layer deeper than the first subterranean layer, the first subterranean layer including a rock formation that includes a source of mobile water, the second subterranean layer including a shale formation that fluidly isolates a portion of the directional wellbore formed within the shale formation from the first subterranean layer; a container configured to be moved through the directional wellbore into the portion of the directional wellbore formed within the shale formation, the container including a volume enclosed by a housing configured to store a plurality of spent nuclear fuel pellets; and a plug set in the directional wellbore between the portion of the directional wellbore formed within the shale formation and the terranean surface.

In an aspect combinable with the general implementation, the directional wellbore is formed through a third subterranean layer between the first and second subterranean layers, the third subterranean layer including a substantially impermeable rock formation.

In another aspect combinable with any of the previous aspects, the impermeable rock formation is more brittle than the shale formation.

In another aspect combinable with any of the previous aspects, the impermeable rock formation is less permeable than the shale formation.

Another aspect combinable with any of the previous aspects further includes a monitoring system, including a monitoring control system communicably coupled to one or more systems positioned proximate the container.

Another aspect combinable with any of the previous aspects further includes a tubular liner constructed in the directional wellbore and sealed against a wall of the directional wellbore.

The present disclosure also describes additional implementations of a hazardous material storage bank. For example, implementations of systems and method for storing a hazardous material include a wellbore formed from a terranean surface to a subterranean zone that includes shale, the wellbore including a substantially vertical portion, a radius portion, and a substantially non-vertical portion; a storage container positioned in the substantially non-vertical portion of the wellbore and including a volume sized to encapsulate a hazardous material that is isolated from a source of mobile water based upon proximity of the storage container in the shale; and a seal positioned in the wellbore between the storage container and an inlet of the wellbore at the terranean surface, the seal configured to fluidly isolate at least a portion of the substantially non-vertical portion from at least a portion of the substantially vertical portion.

As another example, implementations of systems and method for storing a hazardous material include a wellbore formed from a terranean surface to a subterranean zone, the wellbore including a substantially vertical portion, a radius portion, and a substantially non-vertical portion, the subterranean zone including a geologic formation defined by two or more of the following characteristics: a permeability of less than about 0.001 millidarcys, a brittleness of less than about 10 MPa, where brittleness includes a ratio of compressive stress of the shale formation to tensile strength of the shale formation, a thickness of typically about 100 feet, and about 20 to 30% weight by volume of organic material or clay; a storage container positioned in the substantially non-vertical portion of the wellbore and including a volume sized to encapsulate a hazardous material; and a seal positioned in the wellbore between the storage container and an inlet of the wellbore at the terranean surface.

As another example, implementations of systems and method for banking a hazardous material, such as a spent nuclear fuel material, include forming a wellbore from a terranean surface to a subterranean zone that includes shale, the wellbore including a substantially vertical portion, a radius portion, and a substantially non-vertical portion; and pumping a hardenable slurry into the substantially non-vertical portion of the wellbore, the hardenable slurry including a mixture of a hardenable material (e.g., cement, resin, polymer, concrete, grout) and a spent nuclear fuel material.

Implementations of a hazardous material storage bank according to the present disclosure may include one or more of the following features. For example, a hazardous material storage bank according to the present disclosure may allow for multiple levels of containment of hazardous material within a storage bank located thousands of feet underground, decoupled from any nearby mobile water. A hazardous material storage bank according to the present disclosure may also use proven techniques (e.g., drilling) to create or form a storage area for the hazardous material, in a subterranean zone proven to have fluidly sealed hydrocarbons therein for millions of years. As another example, a hazardous material storage bank according to the present disclosure may provide long-term (e.g., thousands of years) storage for hazardous material (e.g., radioactive waste) in a shale formation that has geologic properties suitable for such storage, including low permeability, thickness, and ductility, among others. In addition, a greater volume of hazardous material may be stored at low cost—relative to conventional storage techniques—due in part to directional drilling techniques that facilitate long horizontal boreholes, often exceeding a mile in length. In addition, rock formations that have geologic properties suitable for such storage may be found in close proximity to sites at which hazardous material may be found or generated, thereby reducing dangers associated with transporting such hazardous material.

Implementations of a hazardous material storage bank according to the present disclosure may also include one or more of the following features. Large storage volumes, in turn, allow for the storage of hazardous materials to be emplaced without a need for complex prior treatment, such as concentration or transfer to different forms or containers. As a further example, in the case of nuclear waste material from a reactor for instance, the waste can be kept in its original pellets, unmodified, or in its original fuel rods, or in its original fuel assemblies, which contain dozens of fuel rods. In another aspect, the hazardous material may be kept in an original holder but a cement or other material is injected into the holder to fill the gaps between the hazardous materials and the structure. For example, if the hazardous material is stored in fuel rods which are, in turn, stored in fuel assemblies, then the spaces between the rods (typically filled with water when inside a nuclear reactor) could be filled with cement or other material to provide yet an additional layer of isolation from the outside world. As yet a further example, secure and low cost storage of hazardous material is facilitated while still permitting retrieval of such material if circumstances deem it advantageous to recover the stored materials.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6C are flowcharts that illustrate example methods associated with storing hazardous material according to the present disclosure.

DETAILED DESCRIPTION

The present disclosure describes a hazardous material storage bank system, which includes one or more wellbores formed into a subterranean zone to provide long-term (e.g., tens, hundreds, or even thousands of years) storage of hazardous material (e.g., biological, chemical, nuclear, or otherwise) in one or more underground storage volumes storage containers. The subterranean zone includes multiple subterranean layers having different geological formations and properties. The storage containers may be deposited in a particular subterranean layer based on one or more geologic properties of that layer, such as low permeability, sufficient thickness, low brittleness, and other properties. In some aspects, the particular subterranean layer comprises a shale formation, which forms an isolative seal between the storage containers and another subterranean layer that comprises mobile water.

Figure 1A:
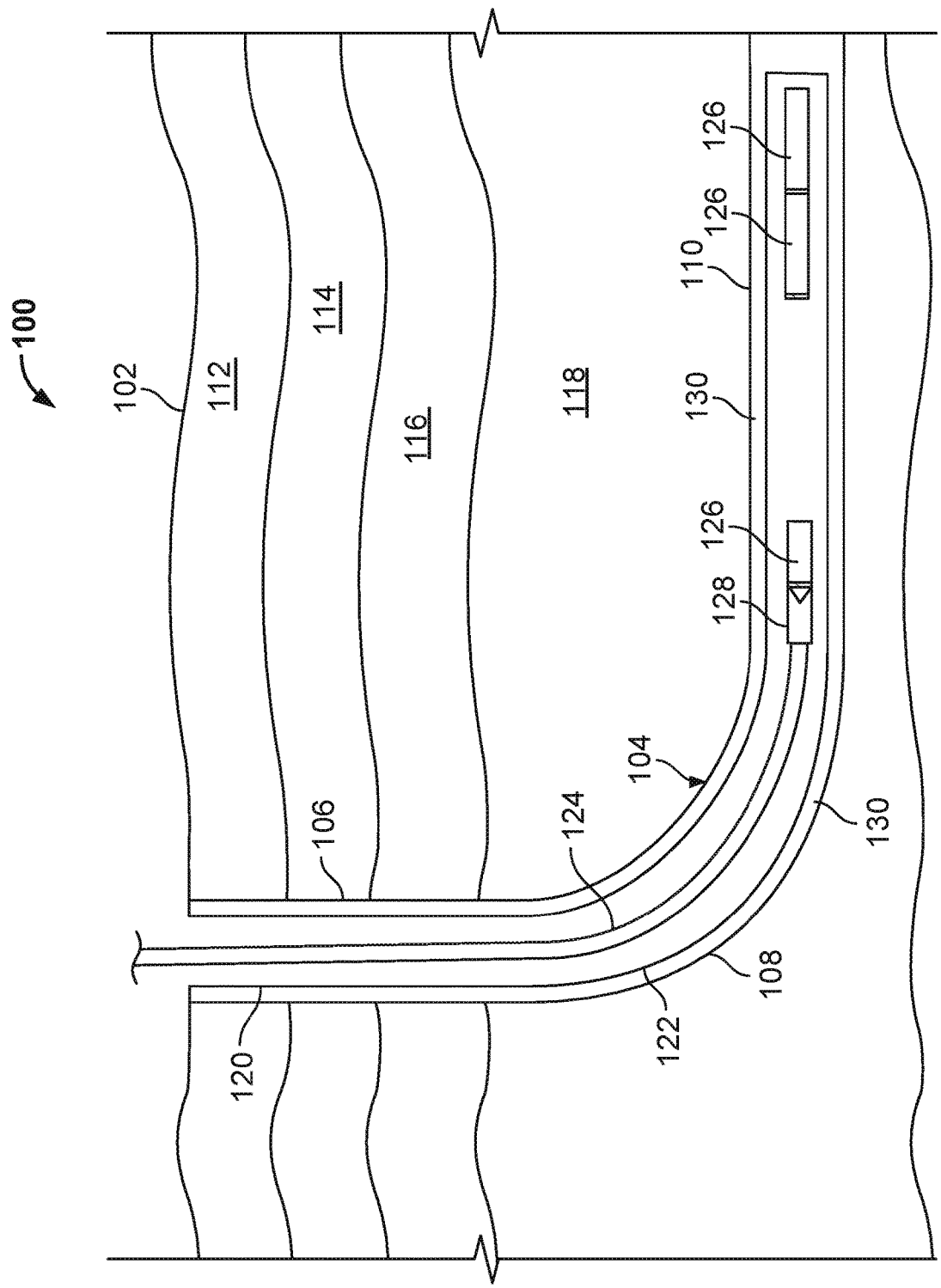
FIGS. 1A-1C are schematic illustrations of example implementations of a hazardous material storage bank system during a deposit or retrieval operation according to the present disclosure.
Figure 1B:
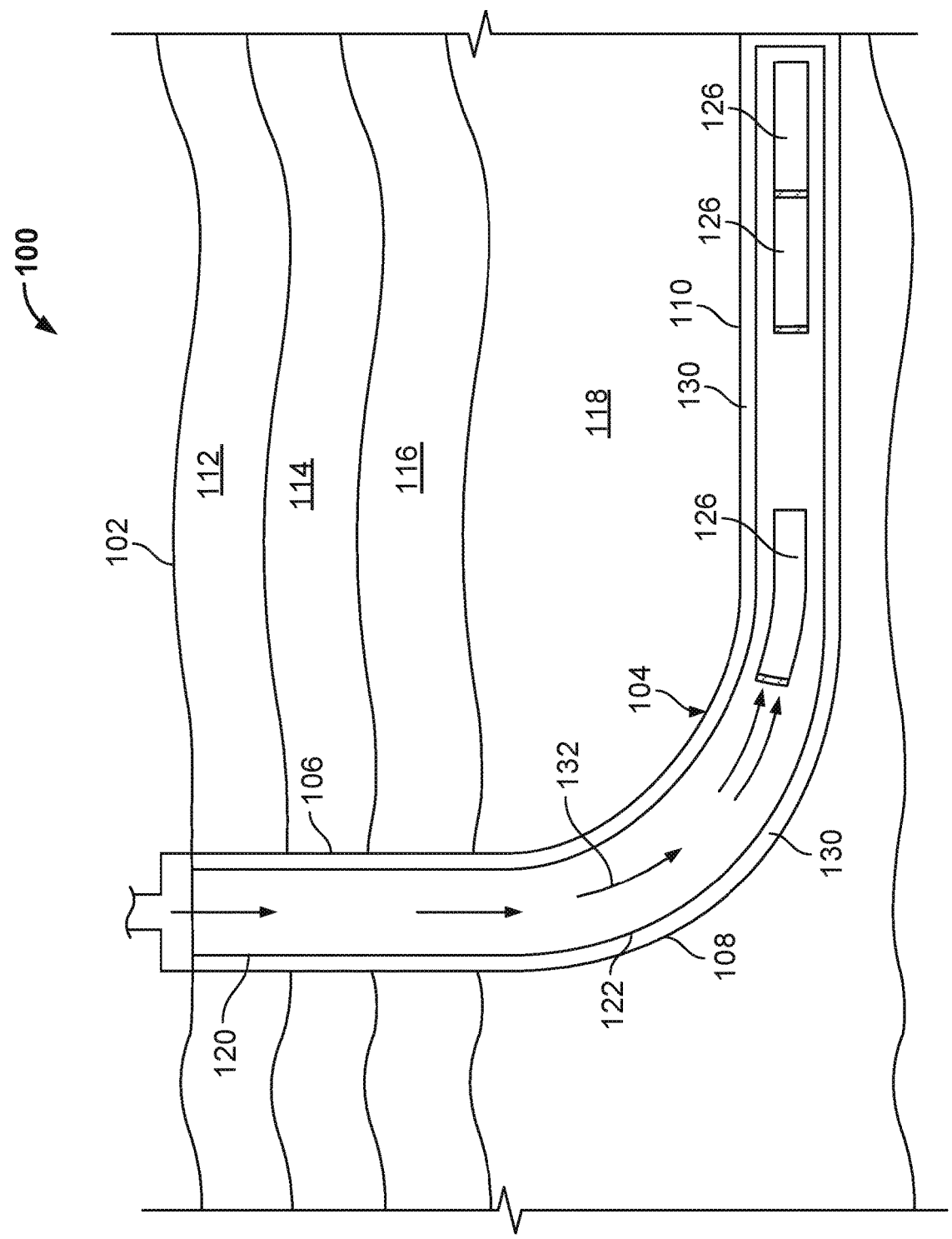
Figure 1C:
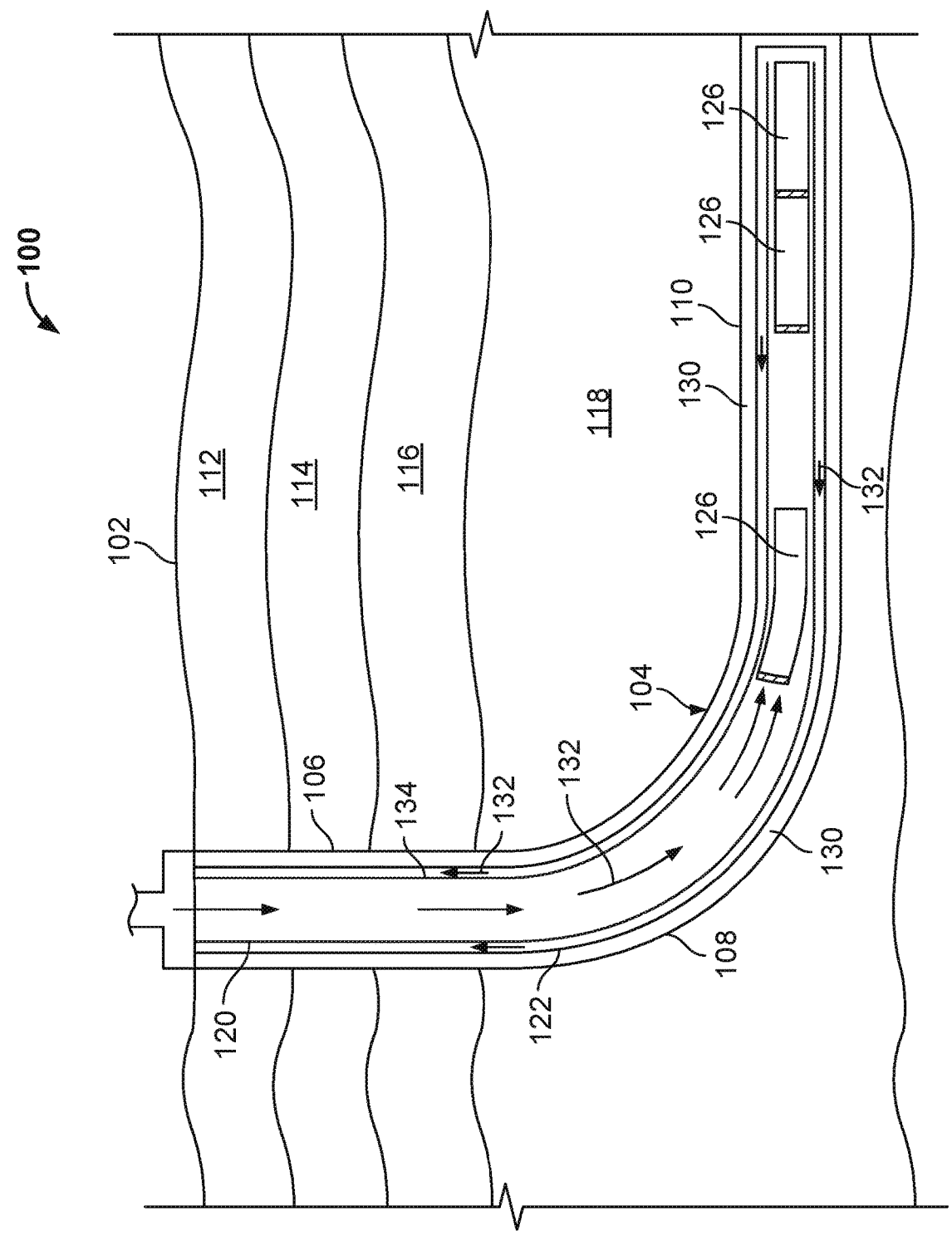

FIGS. 1A-1C are schematic illustrations of example implementations of a hazardous material storage bank system, e.g., a subterranean location for the long-term (e.g., tens, hundreds, or thousands of years or more) but retrievable safe and secure storage of hazardous material, during a deposit or retrieval operation according to the present disclosure. For example, turning to FIG. 1A, this figure illustrates an example hazardous material storage bank system 100 during a deposit (or retrieval, as described below) process, e.g., during deployment of one or more containers of hazardous material in a subterranean formation. As illustrated, the hazardous material storage bank system 100 includes a wellbore 104 formed (e.g., drilled or otherwise) from a terranean surface 102 and through multiple subterranean layers 112, 114, 116, and 118. Although the terranean surface 102 is illustrated as a land surface, terranean surface 102 may be a sub-sea or other underwater surface, such as a lake or an ocean floor or other surface under a body of water. Thus, the present disclosure contemplates that the wellbore 104 may be formed under a body of water from a drilling location on or proximate the body of water.

The illustrated wellbore 104 is a directional wellbore in this example of hazardous material storage bank system 100. For instance, the wellbore 104 includes a substantially vertical portion 106 coupled to a radiussed or curved portion 108, which in turn is coupled to a substantially horizontal portion 110. As used in the present disclosure, "substantially" in the context of a wellbore orientation, refers to wellbores that may not be exactly vertical (e.g., exactly perpendicular to the terranean surface 102) or exactly horizontal (e.g., exactly parallel to the terranean surface 102). In other words, those of ordinary skill in the drill arts would recognize that vertical wellbores often undulate offset from a true vertical direction, that they might be drilled at an angle that deviates from true vertical, and horizontal wellbores often undulate offset from a true horizontal direction. Further, the substantially horizontal portion 110, in some aspects, may be a slant wellbore or other directional wellbore that is oriented between exactly vertical and exactly horizontal. Further, the substantially horizontal portion 110, in some aspects, may be a slant wellbore or other directional well bore that is oriented to follow the slant of the formation. As illustrated in this example, the three portions of the wellbore 104—the vertical portion 106, the radiussed portion 108, and the horizontal portion 110—form a continuous wellbore 104 that extends into the Earth.

The illustrated wellbore 104 has a surface casing 120 positioned and set around the wellbore 104 from the terranean surface 102 into a particular depth in the Earth. For example, the surface casing 120 may be a relatively large-diameter tubular member (or string of members) set (e.g., cemented) around the wellbore 104 in a shallow formation. As used herein, "tubular" may refer to a member that has a circular cross-section, elliptical cross-section, or other shaped cross-section. For example, in this implementation of the hazardous material storage bank system 100, the surface casing 120 extends from the terranean surface through a surface layer 112. The surface layer 112, in this example, is a geologic layer comprised of one or more layered rock formations. In some aspects, the surface layer 112 in this example may or may not include freshwater aquifers, salt water or brine sources, or other sources of mobile water (e.g., water that moves through a geologic formation). In some aspects, the surface casing 112 may isolate the wellbore 104 from such mobile water, and may also provide a hanging location for other casing strings to be installed in the wellbore 104. Further, although not shown, a conductor casing may be set above the surface casing 112 (e.g., between the surface casing 112 and the surface 102 and within the surface layer 112) to prevent drilling fluids from escaping into the surface layer 112.

As illustrated, a production casing 122 is positioned and set within the wellbore 104 downhole of the surface casing 120. Although termed a "production" casing, in this example, the casing 122 may or may not have been subject to hydrocarbon production operations. Thus, the casing 122 refers to and includes any form of tubular member that is set (e.g., cemented) in the wellbore 104 downhole of the surface casing 120. In some examples of the hazardous material storage bank system 100, the production casing 122 may begin at an end of the radiussed portion 108 and extend throughout the substantially horizontal portion 110. The casing 122 could also extend into the radiussed portion 108 and into the vertical portion 106.

As shown, cement 130 is positioned (e.g., pumped) around the casings 120 and 122 in an annulus between the casings 120 and 122 and the wellbore 104. The cement 130, for example, may secure the casings 120 and 122 (and any other casings or liners of the wellbore 104) through the subterranean layers under the terranean surface 102. In some aspects, the cement 130 may be installed along the entire length of the casings (e.g., casings 120 and 122 and any other casings), or the cement 130 could be used along certain portions of the casings if adequate for a particular wellbore 102. The cement 130 can also provide an additional layer of confinement for the hazardous material in containers 126.

The wellbore 104 and associated casings 120 and 122 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 120 may extend down to about 2500 feet TVD, with a diameter of between about 22 in. and 48 in. An intermediate casing (not shown) between the surface casing 120 and production casing 122 may extend down to about 8000 feet TVD, with a diameter of between about 16 in. and 36 in. The production casing 122 may extend substantially horizontally (e.g., to case the substantially horizontal portion 110) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (112-118), particular drilling techniques, as well as a size, shape, or design of a hazardous material container 126 that contains hazardous material to be deposited in the hazardous material storage bank system 100. In some alternative examples, the production casing 122 (or other casing in the wellbore 104) could be circular in cross-section, elliptical in cross-section, or some other shape.

As illustrated, the wellbore 104 extends through subterranean layers 112, 114, and 116, and lands in subterranean layer 118. As discussed above, the surface layer 112 may or may not include mobile water. Subterranean layer 114, which is below the surface layer 112, in this example, is a mobile water layer 114. For instance, mobile water layer 114 may include one or more sources of mobile water, such as freshwater aquifers, salt water or brine, or other source of mobile water. In this example of hazardous material storage bank system 100, mobile water may be water that moves through a subterranean layer based on a pressure differential across all or a part of the subterranean layer. For example, the mobile water layer 114 may be a permeable geologic formation in which water freely moves (e.g., due to pressure differences or otherwise) within the layer 114. In some aspects, the mobile water layer 114 may be a primary source of human-consumable water in a particular geographic area. Examples of rock formations of which the mobile water layer 114 may be composed include porous sandstones and limestones, among other formations.

Below the mobile water layer 114, in this example implementation of hazardous material storage bank system 100, is an impermeable layer 116. The impermeable layer 116, in this example, may not allow mobile water to pass through. Thus, relative to the mobile water layer 114, the impermeable layer 116 may have low permeability, e.g., on the order of nanodarcy permeability. Additionally, in this example, the impermeable layer 116 may be a relatively non-ductile (i.e., brittle) geologic formation. One measure of non-ductility is brittleness, which is the ratio of compressive stress to tensile strength. In some examples, the brittleness of the impermeable layer 116 may be between about 20 MPa and 40 MPa.

As shown in this example, the impermeable layer 116 is shallower (e.g., closer to the terranean surface 102) than the storage layer 119. In this example rock formations of which the impermeable layer 116 may be composed include, for example, certain kinds of sandstone, mudstone, clay, and slate that exhibit permeability and brittleness properties as described above. In alternative examples, the impermeable layer 116 may be deeper (e.g., further from the terranean surface 102) than the storage layer 119. In such alternative examples, the impermeable layer 116 may be composed of an igneous rock, such as granite.

Below the impermeable layer 116 is a storage layer 118. The storage layer 118, in this example, may be chosen as the landing for the substantially horizontal portion 110, which stores the hazardous material, for several reasons. Relative to the impermeable layer 116 or other layers, the storage layer 118 may be thick, e.g., between about 100 and 200 feet of total vertical thickness. Thickness of the storage layer 118 may allow for easier landing and directional drilling, thereby allowing the substantially horizontal portion 110 to be readily emplaced within the storage layer 118 during constructions (e.g., drilling). If formed through an approximate horizontal center of the storage layer 118, the substantially horizontal portion 110 may be surrounded by about 50 to 100 feet of the geologic formation that comprises the storage layer 118. Further, the storage layer 118 may also have no mobile water, e.g., due to a very low permeability of the layer 118 (e.g., on the order of milli- or nanodarcys). In addition, the storage layer 118 may have sufficient ductility, such that a brittleness of the rock formation that comprises the layer 118 is between about 3 MPa and 10 MPa. Examples of rock formations of which the storage layer 118 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 114.

In some examples implementations of the hazardous material storage bank system 100, the storage layer 118 is composed of shale. Shale, in some examples, may have properties that fit within those described above for the storage layer 118. For example, shale formations may be suitable for a long-term confinement of hazardous material (e.g., in the hazardous material containers 126), and for their isolation from mobile water layer 114 (e.g., aquifers) and the terranean surface 102. Shale formations may be found relatively deep in the Earth, typically 3000 feet or greater, and placed in isolation below any fresh water aquifers.

Shale formations, for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of such fluids into surrounding layers (e.g., mobile water layer 114). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

Shale formations may also be at a suitable depth, e.g., between 3000 and 12,000 feet TVD. Such depths are typically below ground water aquifer (e.g., surface layer 112 and/or mobile water layer 114). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., impermeable layer 116). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., granite or otherwise). For example, rock formations in the impermeable layer 116 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 112, 114, 116, and 118. For example, there may be repeating patterns (e.g., vertically), of one or more of the mobile water layer 114, impermeable layer 116, and storage layer 118. Further, in some instances, the storage layer 118 may be directly adjacent (e.g., vertically) the mobile water layer 114, i.e., without an intervening impermeable layer 116.

FIG. 1A illustrates an example of a deposit operation of hazardous material in the substantially horizontal portion 110 of the wellbore 104. For example, as shown, a work string 124 (e.g., tubing, coiled tubing, wireline, or otherwise) may be extended into the cased wellbore 104 to place one or more (three shown but there may be more or less) hazardous material containers 126 into long term, but in some aspects, retrievable, storage in the portion 110. For example, in the implementation shown in FIG. 1A, the work string 124 may include a downhole tool 128 that couples to the container 126, and with each trip into the wellbore 104, the downhole tool 128 may deposit a particular hazardous material container 126 in the substantially horizontal portion 110.

The downhole tool 128 may couple to the container 126 by, in some aspects, a threaded connection. In alternative aspects, the downhole tool 128 may couple to the container 126 with an interlocking latch, such that rotation of the downhole tool 128 may latch to (or unlatch from) the container 126. In alternative aspects, the downhole tool 124 may include one or more magnets (e.g., rare Earth magnets, electromagnets, a combination thereof, or otherwise) which attractingly couple to the container 126. In some examples, the container 126 may also include one or more magnets (e.g., rare Earth magnets, electromagnets, a combination thereof, or otherwise) of an opposite polarity as the magnets on the downhole tool 124. In some examples, the container 126 may be made from or include a ferrous or other material attractable to the magnets of the downhole tool 124.

As another example, each container 126 may be positioned within the wellbore 104 by a wellbore tractor (e.g., on a wireline or otherwise), which may push or pull the container into the substantially horizontal portion 110 through motorized (e.g., electric) motion. As yet another example, each container 126 may include or be mounted to rollers (e.g., wheels), so that the downhole tool 124 may push the container 126 into the cased wellbore 104.

In some example implementations, the container 126, one or more of the wellbore casings 120 and 122, or both, may be coated with a friction-reducing coating prior to the deposit operation. For example, by applying a coating (e.g., petroleum-based product, resin, ceramic, or otherwise) to the container 126 and/or wellbore casings, the container 126 may be more easily moved through the cased wellbore 104 into the substantially horizontal portion 100. In some aspects, only a portion of the wellbore casings may be coated. For example, in some aspects, the substantially vertical portion 106 may not be coated, but the radiussed portion 108 or the substantially horizontal portion 110, or both, may be coated to facilitate easier deposit and retrieval of the container 126.

FIG. 1A also illustrates an example of a retrieval operation of hazardous material in the substantially horizontal portion 110 of the wellbore 104. A retrieval operation may be the opposite of a deposit operation, such that the downhole tool 124 (e.g., a fishing tool) may be run into the wellbore 104, coupled to the last-deposited container 126 (e.g., threadingly, latched, by magnet, or otherwise), and pull the container 126 to the terranean surface 102. Multiple retrieval trips may be made by the downhole tool 124 in order to retrieve multiple containers from the substantially horizontal portion 110 of the wellbore 104.

Each container 126 may enclose hazardous material. Such hazardous material, in some examples, may be biological or chemical waste or other biological or chemical hazardous material. In some examples, the hazardous material may include nuclear material, such as spent nuclear fuel recovered from a nuclear reactor (e.g., commercial power or test reactor) or military nuclear material. For example, a gigawatt nuclear plant may produce 30 tons of spent nuclear fuel per year. The density of that fuel is typically close to 10 (10 gm/cm$^3$=10 kg/liter), so that the volume for a year of nuclear waste is about 3 m$^3$. Spent nuclear fuel, in the form of nuclear fuel pellets, may be taken from the reactor and not modified. Nuclear fuel pellets are solid, and emit very little gas other than short-lived tritium (13 year half-life).

In some aspects, the storage layer 118 should be able to contain any radioactive output (e.g., gases) within the layer 118, even if such output escapes the containers 126. For example, the storage layer 118 may be selected based on diffusion times of radioactive output through the layer 118. For example, a minimum diffusion time of radioactive output escaping the storage layer 118 may be set at, for example, fifty times a half-life for any particular component of the nuclear fuel pellets. Fifty half-lives as a minimum diffusion time would reduce an amount of radioactive output by a factor of $1\times10^{-15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid is not capable of diffusion through a matrix of the rock formation that comprises the illustrated storage layer 118 (e.g., shale or other formation). The storage layer 118, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

Turning to FIG. 1B, an alternative deposit operation is illustrated. In this example deposit operation, a fluid 132 (e.g., liquid or gas) may be circulated through the wellbore 104 to fluidly push the containers 126 into the substantially horizontal wellbore portion 110. In some example, each container 126 may be fluidly pushed separately. In alternative aspects, two or more containers 126 may be fluidly pushed, simultaneously, through the wellbore 104 for deposit into the substantially horizontal portion 110. The fluid 132 can be, in some cases, water. Other examples include a drilling mud or drilling foam. In some examples, a gas may be used to push the containers 126 into the wellbore, such as air, argon, or nitrogen.

In some aspects, the choice of fluid 132 may depend at least in part on a viscosity of the fluid 132. For example, a fluid 132 may be chosen with enough viscosity to impede the drop of the container 126 into the substantially vertical portion 106. This resistance or impedance may provide a safety factor against a sudden drop of the container 126. The fluid 132 may also provide lubrication to reduce a sliding friction between the container 126 and the casings 120 and 122. The container 126 can be conveyed within a casing filled with a liquid of controlled viscosity, density, and lubricant qualities. The fluid-filled annulus between the inner diameter of the casings 120 and 122 and the outer diameter of the conveyed container 126 represents an opening designed to dampen any high rate of container motion, providing automatic passive protection in an unlikely decoupling of the conveyed container 126.

In some aspects, other techniques may be employed to facilitate deposit of the container 126 into the substantially horizontal portion 110. For example, one or more of the installed casings (e.g., casings 120 and 122) may have rails to guide the storage container 126 into the wellbore 102 while reducing friction between the casings and the container 126. The storage container 126 and the casings (or the rails) may be made of materials that slide easily against one another. The casings may have a surface that is easily lubricated, or one that is self-lubricating when subjected to the weight of the storage container 126.

The fluid 132 may also be used for retrieval of the container 126. For example, in an example retrieval operation, a volume within the casings 120 and 122 may be filled with a compressed gas (e.g., air, nitrogen, argon, or otherwise). As the pressure increases at an end of the substantially horizontal portion 110, the containers 126 may be pushed toward the radiussed portion 108, and subsequently through the substantially vertical portion 106 to the terranean surface.

Turning to FIG. 1C, another alternative deposit operation is illustrated. In this example deposit operation, the fluid 132 (e.g., liquid or gas) may be circulated through a tubular fluid control casing 134 to fluidly push the containers 126 into the substantially horizontal wellbore portion 110. The fluid 132 may circulate through an end of the substantially horizontal portion 110 in the fluid control casing 134 and recirculate back to the terranean surface 102 in an annulus between the fluid control casing 134 and the casings 122 and 120. In some examples, each container 126 may be fluidly pushed separately. The annulus between the fluid control casing 134 and the casings 120 and 122 may be filled with a fluid or compressed gas to reverse the flow of fluid 132, e.g., in order to push the containers 126 back towards the terranean surface 102. In alternative aspects, two or more containers 126 may be fluidly pushed, simultaneously, through the wellbore 104 for deposit into the substantially horizontal portion 110. The fluid control casing 134 could be similar or identical to the production casing 122. For that case, a separate tubular member could be enclosed in the wellbore 102 or within the production casing 122 to provide a return path for the fluid 132.

In some aspects, the wellbore 104 may be formed for the primary purpose of long-term storage of hazardous materials. In alternative aspects, the wellbore 104 may have been previously formed for the primary purpose of hydrocarbon production (e.g., oil, gas). For example, storage layer 118 may be a hydrocarbon bearing formation from which hydrocarbons were produced into the wellbore 104 and to the terranean surface 102. In some aspects, the storage layer 118 may have been hydraulically fractured prior to hydrocarbon production. Further in some aspects, the production casing 122 may have been perforated prior to hydraulic fracturing. In such aspects, the production casing 122 may be patched (e.g., cemented) to repair any holes made from the perforating process prior to a deposit operation of hazardous material. In addition, any cracks or openings in the cement between the casing and the drill hole can also be filled at that time.

For example, in the case of spent nuclear fuel as a hazardous material, the wellbore may be formed at a particular location, e.g., near a nuclear power plant, as a new wellbore provided that the location also includes an appropriate storage layer 118, such as a shale formation. Alternatively, an existing well that has already produced shale gas, or one that was abandoned as "dry," (e.g., with sufficiently low organics that the gas in place is too low for commercial development), may be selected as the wellbore 104. In some aspects, prior hydraulic fracturing of the storage layer 118 through the wellbore 104 may make little difference in the hazardous material storage capability of the wellbore 104. But such a prior activity may also confirm the ability of the storage layer 118 to store gases and other fluids for millions of years. If, therefore, the hazardous material or output of the hazardous material (e.g., radioactive gasses or otherwise) were to escape from the container 126 and enter the fractured formation of the storage layer 118, such fractures may allow that material to spread relatively rapidly over a distance comparable in size to that of the fractures. In some aspects, the wellbore 102 may have been drilled for a production of hydrocarbons, but production of such hydrocarbons had failed, e.g., because the storage layer 118 comprised a rock formation (e.g., shale or otherwise) that was too ductile and difficult to fracture for production, but was advantageously ductile for the long-term storage of hazardous material.

Figure 2A:
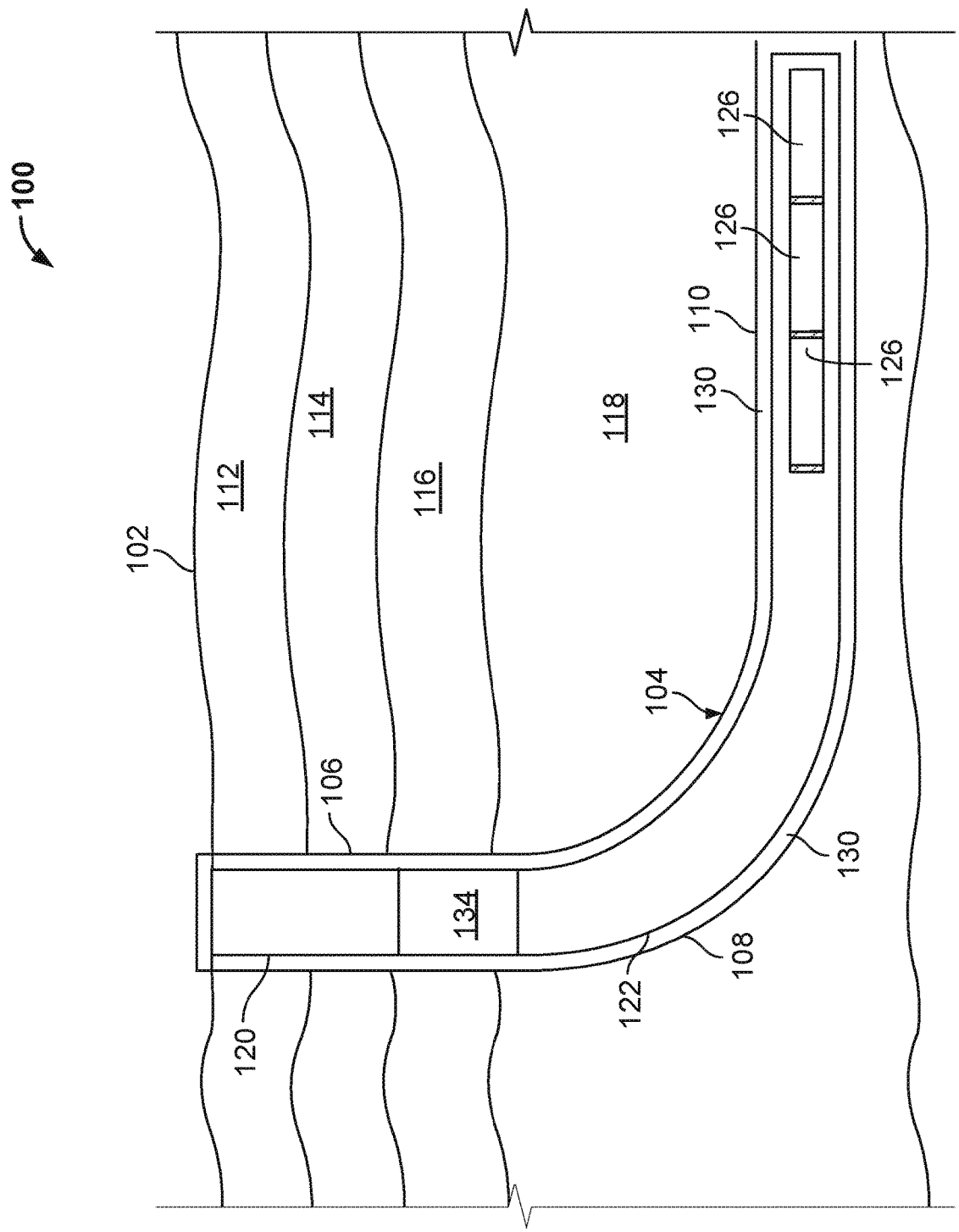
FIGS. 2A-2E are schematic illustrations of example implementations of a hazardous material storage bank system during storage and monitoring operations according to the present disclosure.

FIGS. 2A-2E are schematic illustrations of example implementations of a hazardous material storage bank system during storage and monitoring operations according to the present disclosure. For example, FIG. 2A illustrates the hazardous material storage bank system 100 in a long term storage operation. One or more hazardous material containers 126 are positioned in the substantially horizontal portion 110 of the wellbore 104. A seal 134 is placed in the wellbore 104 between the location of the containers 126 in the substantially horizontal portion 110 and an opening of the substantially vertical portion 106 at the terranean surface 102 (e.g., a well head). In this example, the seal 134 is placed at an uphole end of the substantially vertical portion 108. Alternatively, the seal 134 may be positioned at another location within the substantially vertical portion 106, in the radiussed portion 108, or even within the substantially horizontal portion 110 uphole of the containers 126. In some aspects, the seal 134 may be placed at least deeper than any source of mobile water, such as the mobile water layer 114, within the wellbore 104. In some aspects, the seal 134 may be formed substantially along an entire length of the substantially vertical portion 106.

As illustrated, the seal 134 fluidly isolates the volume of the substantially horizontal portion 110 that stores the containers 126 from the opening of the substantially vertical portion 106 at the terranean surface 102. Thus, any hazardous material (e.g., radioactive material) that does escape the containers 126 may be sealed (e.g., such that liquid, gas, or solid hazardous material) does not escape the wellbore 104. The seal 134, in some aspects, may be a cement plug or other plug, that is positioned or formed in the wellbore 104. As another example, the seal 134 may be formed from one or more inflatable or otherwise expandable packers positioned in the wellbore 104.

Prior to a retrieval operation (e.g., as discussed with reference to FIGS. 1A-1B), the seal 134 may be removed. For example, in the case of a cement or other permanently set seal 134, the seal 134 may be drilled through or otherwise milled away. In the case of semi-permanent or removable seals, such as packers, the seal 134 may be removed from the wellbore 104 through a conventional process as is known.

Figure 2B:
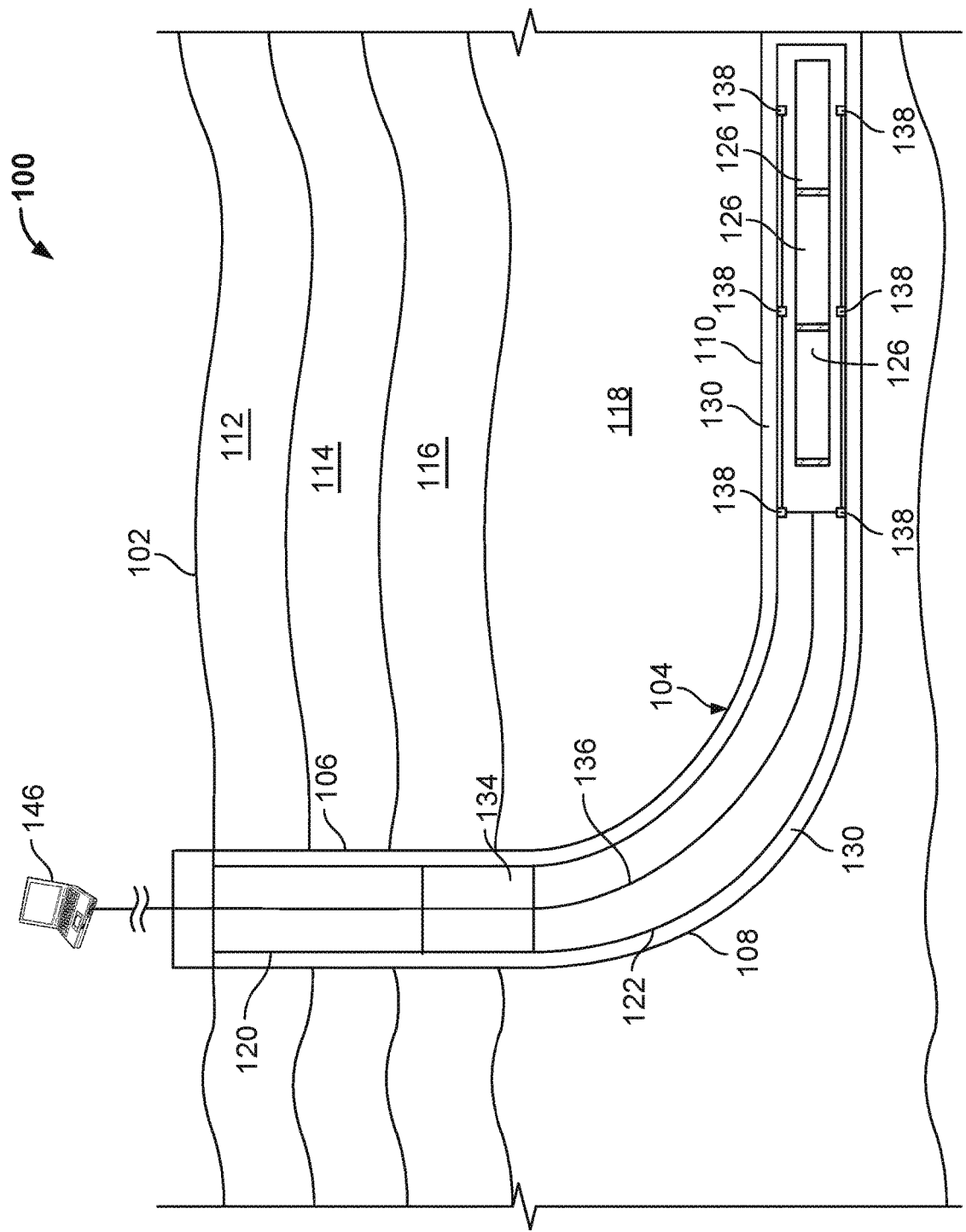

FIG. 2B illustrates an example monitoring operation during long term storage of the containers 126. For example, in some aspects, it may be advantageous or required to monitor one or more variables during long term storage of the hazardous material in the containers 126. In this example of FIG. 2B, the monitoring system includes one or more sensors 138 placed in the wellbore 104 (e.g., within the substantially horizontal portion 110) and communicably coupled to a monitoring control system 146 through a cable 136 (e.g., electrical, optical, hydraulic, or otherwise). Although illustrated as within wellbore 102 (e.g., inside of the casings), the sensors 138 may be placed outside of the casings, or even built into the casings before the casings are installed in the wellbore 102. Sensors 138 could also be placed outside the casing (e.g., casings 120 and/or 122), or outside the fluid control casing 134.

As shown, the sensors 138 may monitor one or more variables, such as, for example, radiation levels, temperature, pressure, presence of oxygen, a presence of water vapor, a presence of liquid water, acidity, seismic activity, or a combination thereof. Data values related to such variables may be transmitted along the cable 136 to the monitoring control system 146. The monitoring control system 146, in turn, may record the data, determine trends in the data (e.g., rise of temperature, rise of radioactive levels), send data to other monitoring locations, such as national security or environmental center locations, and may further automatically recommend actions (e.g., retrieval of the containers 126) based on such data or trends. For example, a rise in temperature or radioactive level in the wellbore 104 above a particular threshold level may trigger a retrieval recommendation, e.g., to ensure that the containers 126 are not leaking radioactive material. In some aspects, there may be a one-to-one ratio of sensors 138 to containers 126. In alternative aspects, there may be multiple sensors 138 per container 126, or there may be fewer.

Figure 2C:
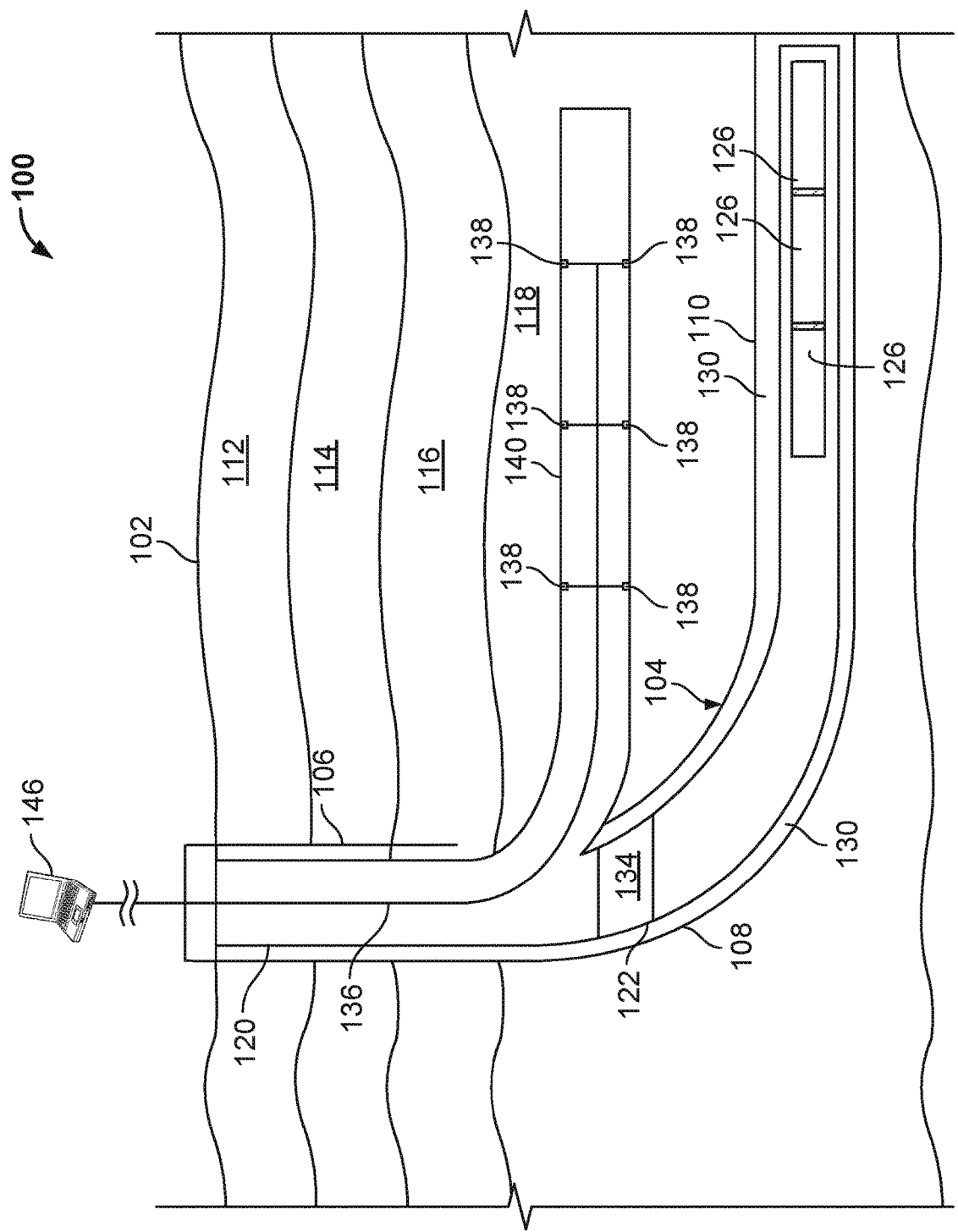

FIG. 2C shows another example monitoring operation during long term storage of the containers 126. In this example, sensors 138 are positioned within a secondary horizontal wellbore 140 that is formed separately from the substantially vertical portion 106. The secondary horizontal wellbore 140 may be an uncased wellbore, through which the cable 136 may extend between the monitoring control system 146 and the sensors 138. In this example, the secondary horizontal wellbore 140 is formed above the substantially horizontal portion 110 but within the storage layer 118. Thus, the sensors 138 may record data (e.g., radiation levels, temperature, acidity, seismic activity) of the storage layer 118. In alternative aspects, the secondary horizontal wellbore 140 may be formed below the storage layer 118, above the storage layer in the impermeable layer 116, or in other layers. Further, although FIG. 2C shows the secondary horizontal wellbore 140 formed from the same substantially vertical portion 106 as the substantially horizontal portion 110, the secondary horizontal wellbore 140 may be formed from a separate vertical wellbore and radiussed wellbore.

Figure 2D:
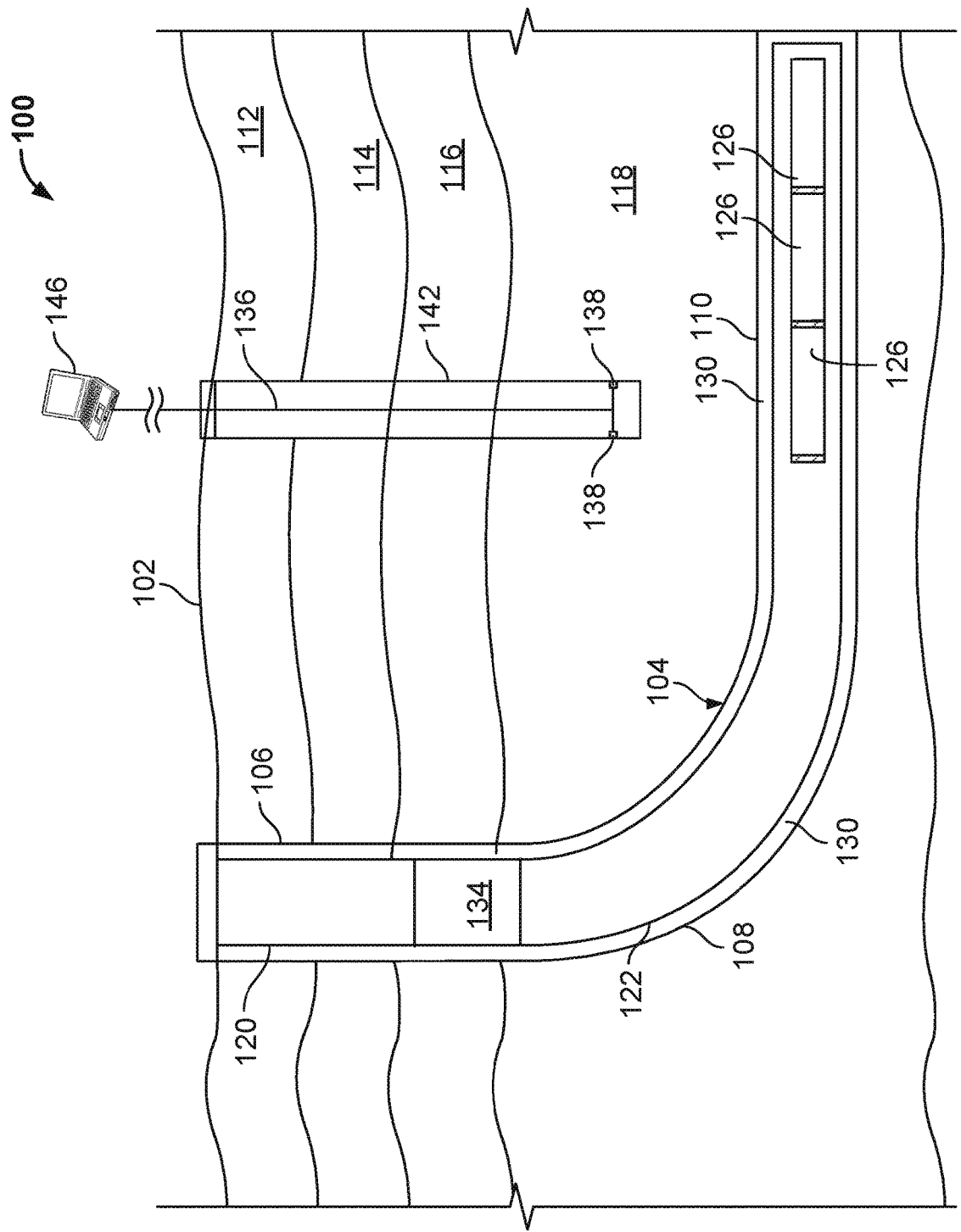

FIG. 2D shows another example monitoring operation during long term storage of the containers 126. In this example, sensors 138 are positioned within a secondary vertical wellbore 142 that is formed separately from the wellbore 104. The secondary vertical wellbore 142 may be a cased or an uncased wellbore, through which the cable 136 may extend between the monitoring control system 146 and the sensors 1388. In this example, the secondary vertical wellbore 142 bottoms out above the substantially horizontal portion 110 but within the storage layer 118. Thus, the sensors 1388 may record data (e.g., radiation levels, temperature, acidity, seismic activity) of the storage layer 118. In alternative aspects, the secondary vertical wellbore 140 may bottom out below the storage layer 118, above the storage layer in the impermeable layer 116, or in other layers. Further, although shown placed in the secondary vertical wellbore 142 at a level adjacent the storage layer 118, sensors 138 may be placed anywhere within the secondary vertical wellbore 142. Alternatively, the secondary vertical wellbore 142 may, in some aspects, be constructed prior to wellbore 102, thereby permitting monitoring by installed sensors 138 during construction of the wellbore 102. Also, the monitoring borehole 142 could be sealed to prevent the possibility that material that leaks into borehole 142 would have a path to the terranean surface 102.

Figure 2E:
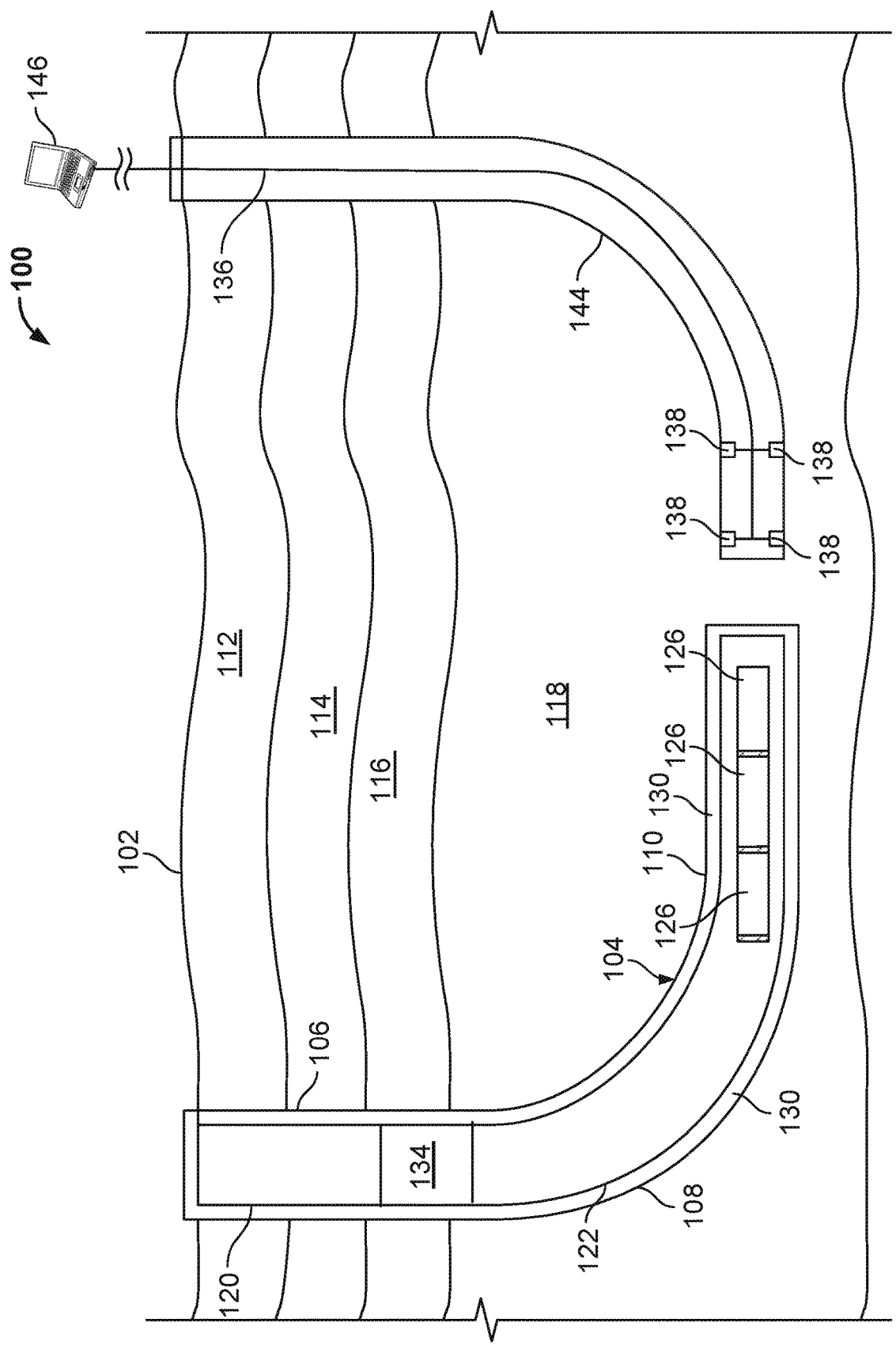

FIG. 2E shows another example monitoring operation during long term storage of the containers 126. In this example, sensors 138 are positioned within a secondary directional wellbore 144 that is formed separately from the wellbore 104. The secondary directional wellbore 144 may be an uncased wellbore, through which the cable 136 may extend between the monitoring control system 146 and the sensors 138. In this example, the secondary directional wellbore 144 lands adjacent the substantially horizontal portion 110 and within the storage layer 118. Thus, the sensors 138 may record data (e.g., radiation levels, temperature, acidity, seismic activity) of the storage layer 118. In alternative aspects, the secondary directional wellbore 144 may land below the storage layer 118, above the storage layer in the impermeable layer 116, or in other layers. Further, although shown placed in the secondary directional wellbore 144 at a level adjacent the storage layer 118, sensors 138 may be placed anywhere within the secondary directional wellbore 144. In some aspects, the secondary directional wellbore 144 may be used for retrieval of the containers 126, for example, in case the wellbore 104 is inaccessible.

Figure 3A:
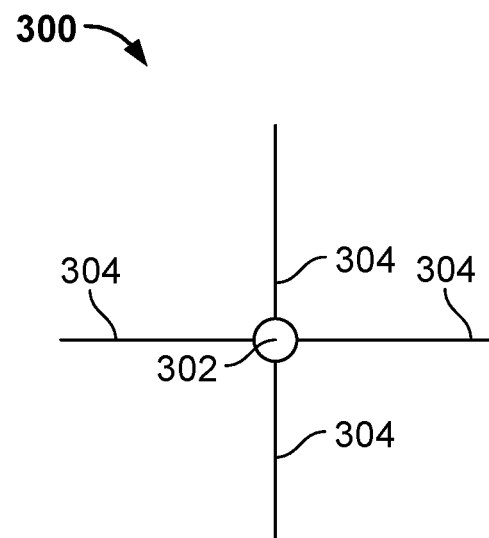
FIGS. 3A-3B are schematic illustrations of other example implementations of a hazardous material storage bank system according to the present disclosure.

FIG. 3A is a schematic illustration of another example implementation of a hazardous material storage bank system according to the present disclosure. FIG. 3A illustrates an overhead schematic diagram of an hazardous material storage bank system 300 that illustrates an example configuration of wellbores that can be formed or used to store hazardous material, such as spent nuclear fuel, biological material, or chemical material. Hazardous material storage bank system 300 includes a vertical wellbore 302 (viewed from above here) with multiple horizontal wellbores 304 extending therefrom. In this example, four horizontal wellbores 304 may be formed from the single vertical wellbore 302.

The example hazardous material storage bank system 300 shows a storage bank that can provide long-term (e.g., millions of years) storage for a volume of hazardous material greater than, for example, the hazardous material storage bank system 100. For instance, each horizontal wellbore 304 may be substantially similar to the substantially horizontal portion 110 shown in FIG. 2A, which can store one or more containers 126 of hazardous material. Each horizontal wellbore 304 may be formed in the storage layer 118 or below the storage layer 118 to provide a sufficient seal against the diffusion of hazardous output in the event of a leak from the one or more containers. Thus, in the example of hazardous material storage bank system 300, hazardous material may be stored more efficiently, as only a single vertical wellbore 302 need be formed to account for multiple horizontal wells 304.

Figure 3B:
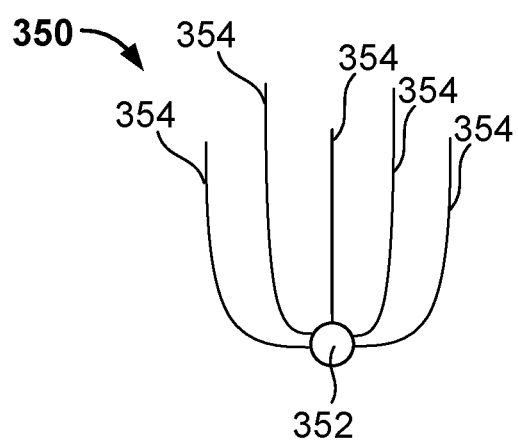

FIG. 3B is another schematic illustration of another example implementation of a hazardous material storage bank system according to the present disclosure. FIG. 3B illustrates an overhead schematic diagram of an hazardous material storage bank system 350 that illustrates an example configuration of wellbores that can be formed or used to store hazardous material, such as spent nuclear fuel, biological material, or chemical material. In this example, the system 350 includes a vertical wellbore 352 with multiple lateral wellbores 354 formed from the vertical wellbore 352. The lateral wellbores 354, in this example, are substantially parallel to each other in a "pitchfork" pattern (or other pattern, such as an "F" pattern, crow's foot pattern, or otherwise). Each lateral wellbore 354 may be formed in the storage layer 118 or below the storage layer 118 to provide a sufficient seal against the diffusion of hazardous output in the event of a leak from the one or more containers. In addition, each lateral wellbore 354 may be or include a storage area for containers 126.

Figure 4A:
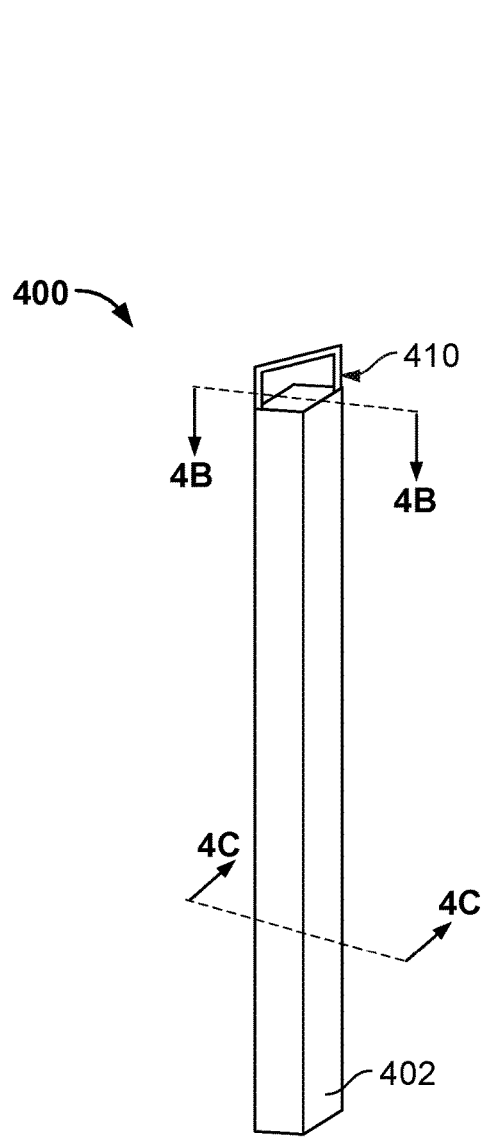
FIGS. 4A-4C are schematic illustrations of an example implementation of a hazardous material container according to the present disclosure.
Figure 4B:
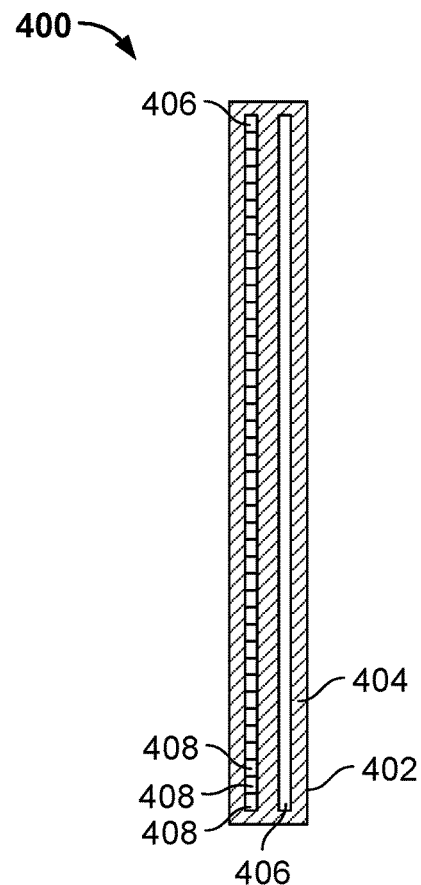
Figure 4C:
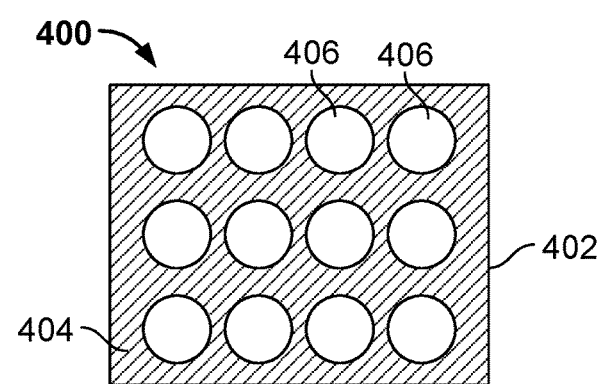

FIGS. 4A-4C are schematic illustrations of an example implementation of a hazardous material container according to the present disclosure. FIGS. 4A-4C illustrate isometric, vertical cross-section, and horizontal cross-section views, respectively, of a hazardous material container 400. In some aspects, the hazardous material container 400 may be similar to the illustrated container 126 and usable in the hazardous material storage bank system 100, the hazardous material storage bank system 400, or other hazardous material storage bank system according to the present disclosure. The hazardous material container 400 may be used to store chemical hazardous material, biological hazardous material, nuclear hazardous material, or otherwise. For example, in the illustrated implementation, the hazardous material container 400 stores spent nuclear fuel in the form of spent nuclear fuel rods 406.

As illustrated, the hazardous material container 400 includes a housing 402 (e.g., a crush-proof or crush resistant housing) that encloses a volume 404 to store the hazardous material. In this example, the spent nuclear fuel rods 406 are positioned in the housing 402 prior to sealing of the hazardous material container 400. Each spent nuclear fuel rod 406 comprises multiple spent nuclear fuel pellets 408. For example, the spent nuclear fuel pellets 408 contain most of the radioisotopes (including the tritium) of the spent nuclear fuel removed from a nuclear reactor. To form the spent nuclear fuel rods 406, the fuel pellets 408 are surrounded by zirconium tubes, just as in the reactor. These tubes offer an additional level of containment. The tubes can be mounted in the original fuel assemblies, or removed from those assemblies for tighter packing for the spent nuclear fuel rods 406. The tubes are placed in sealed capsules to form the rods 406, typically 15 feet long, with a diameter large enough to store a substantial number of fuel pellets 408, yet small enough to permit placement in the housing 402.

In some aspects, the housing 402 (and other components of the hazardous material container 400) may be formed from metals or ceramics that, for example, have very high resistance to corrosion or radioactivity (e.g., zirconium or its alloy zircaloy, stainless steel, titanium, or other low corrosion materials). In addition, in some aspects, a storage area into which the container 400 is placed may be filled or partially filled with nitrogen, argon, or some other gas that reduces danger of corrosion to the housing 402 and other components of the container 400.

Further, the dimensions of the housing 402 (and hazardous material container 400, generally) may be designed to fit in a wellbore, such as the wellbore 104. Example dimensions of the housing 402 may include a length, L, of between 12 and 15 feet, and, in the case of a substantially square housing 402, side width, W, of between 5 and 9 inches. The housing 402, in alternative aspects, may have a substantially circular horizontal cross-section diameter of between about 7 and 13 in. In some examples, the hazardous material container 400 (and container 126) may be sized (e.g., length and width/diameter) for efficient deposit and retrieval into and from the wellbore 104. For example, the length, L, may be determined based on, e.g., the radius dimension of the radiussed portion 108, to ensure that the hazardous material container 400 may be moved through the radiussed portion 108 and into the substantially horizontal portion 110. As another example, the width, W, may be determined based on a diameter of one or more of the casings in the wellbore 104, such as the surface casing 120 and the production casing 122.

The illustrated hazardous material container 400 also includes a connector portion 410, which is shown on one end of the housing 402 but may be formed on both ends as well. In some aspects, the connector portion 410 may facilitate coupling of the hazardous material container 400 to a downhole tool (e.g., downhole tool 128) to permit deposit and retrieval of the hazardous material container 400 from storage in a wellbore. Further, the connector portion 410 may facilitate coupling of one hazardous material container 400 to another hazardous material container 400. The connector portion 410, in some aspects, may be a threaded connection. For example, a connector portion 410 on one end of the housing 402 may be a male threaded connection while a connector portion 410 on the opposite end of the housing 402 may be a female threaded connection. In alternative aspects, the connector portion 410 may be an interlocking latch, such that rotation (e.g., 360 degrees or less) may latch (or unlatch) the housing 402 to a downhole tool or other hazardous material container 400. In alternative aspects, the connector portion 410 may include one or more magnets (e.g., rare Earth magnets, electromagnets, a combination thereof, or otherwise) which attractingly couple to, e.g., a downhole tool or another hazardous material container 400.

Referring generally to FIGS. 1A-1B, 2A-2E, 4A-4C, the example hazardous material storage bank system (e.g., 100, 300, and otherwise) may provide for multiple layers of containment to ensure that a hazardous material (e.g., biological, chemical, nuclear) is sealingly stored in an appropriate subterranean layer. In some example implementations, there may be at least twelve layers of containment. In alternative implementations, a fewer or a greater number of containment layers may be employed.

First, using spent nuclear fuel as an example hazardous material, the fuel pellets are taken from the reactor and not modified. They may be made from sintered uranium dioxide ($UO_2$), a ceramic, and may remain solid and emit very little gas other than short-lived tritium. Unless the pellets are exposed to extremely corrosive conditions or other effects that damage the multiple layers of containment, most of the radioisotopes (including the tritium) will be contained in the pellets.

Second, the fuel pellets are surrounded by the zircaloy tubes of the fuel rods, just as in the reactor. As described, the tubes could be mounted in the original fuel assemblies, or removed from those assemblies for tighter packing.

Third, the tubes are placed in the sealed housings of the hazardous material container. The housing may be a unified structure or multi-panel structure, with the multiple panels (e.g., sides, top, bottom) mechanically fastened (e.g., screws, rivets, welds, and otherwise).

Fourth, a material (e.g., solid or fluid) may fill the hazardous material container to provide a further buffer between the material and the exterior of the container.

Fifth, the hazardous material container(s) are positioned (as described above), in a wellbore that is lined with a steel or other sealing casing that extends, in some examples, throughout the entire wellbore (e.g., a substantially vertical portion, a radiussed portion, and a substantially horizontal portion). The casing is cemented in place, providing a relatively smooth surface (e.g., as compared to the wellbore wall) for the hazardous material container to be moved through, thereby reducing the possibility of a leak or break during deposit or retrieval.

Sixth, the cement that holds or helps hold the casing in place, may also provide a sealing layer to contain the hazardous material should it escape the container.

Seventh, the hazardous material container is stored in a portion of the wellbore (e.g., the substantially horizontal portion) that is positioned within a thick (e.g., 100-200 feet) seam of a rock formation that comprises a storage layer. The storage layer may be chosen due at least in part to the geologic properties of the rock formation (e.g., no mobile water, low permeability, thick, appropriate ductility or non-brittleness). For example, in the case of shale as the rock formation of the storage layer, this type of rock may offers a level of containment since it is known that shale has been a seal for hydrocarbon gas for millions of years. The shale may contain brine, but that brine is demonstrably immobile, and not in communication with surface fresh water.

Eighth, in some aspects, the rock formation of the storage layer may have other unique geological properties that offer another level of containment. For example, shale rock often contains reactive components, such as iron sulfide, that reduce the likelihood that hazardous materials (e.g., spent nuclear fuel and its radioactive output) can migrate through the storage layer without reacting in ways that reduce the diffusion rate of such output even further. Further, the storage layer may include components, such as clay and organic matter, that typically have extremely low diffusivity. For example, shale may be stratified and composed of thinly alternating layers of clays and other minerals. Such a stratification of a rock formation in the storage layer, such as shale, may offer this additional layer of containment.

Ninth, the storage layer may be located deeper than, and under, an impermeable layer, which separates the storage layer (e.g., vertically) from a mobile water layer.

Tenth, the storage layer may be selected based on a depth (e.g., 3000 to 12,000 ft.) of such a layer within the subterranean layers. Such depths are typically far below any layers that contain mobile water, and thus, the sheer depth of the storage layer provides an additional layer of containment.

Eleventh, example implementations of the hazardous material storage bank system of the present disclosure facilitate monitoring of the stored hazardous material. For example, if monitored data indicates a leak or otherwise of the hazardous material (e.g., change in temperature, radioactivity, or otherwise), or even tampering or intrusion of the container, the hazardous material container may be retrieved for repair or inspection.

Twelfth, the one or more hazardous material containers may be retrievable for periodic inspection, conditioning, or repair, as necessary (e.g., with or without monitoring). Thus, any problem with the containers may be addressed without allowing hazardous material to leak or escape from the containers unabated.

Figure 5:
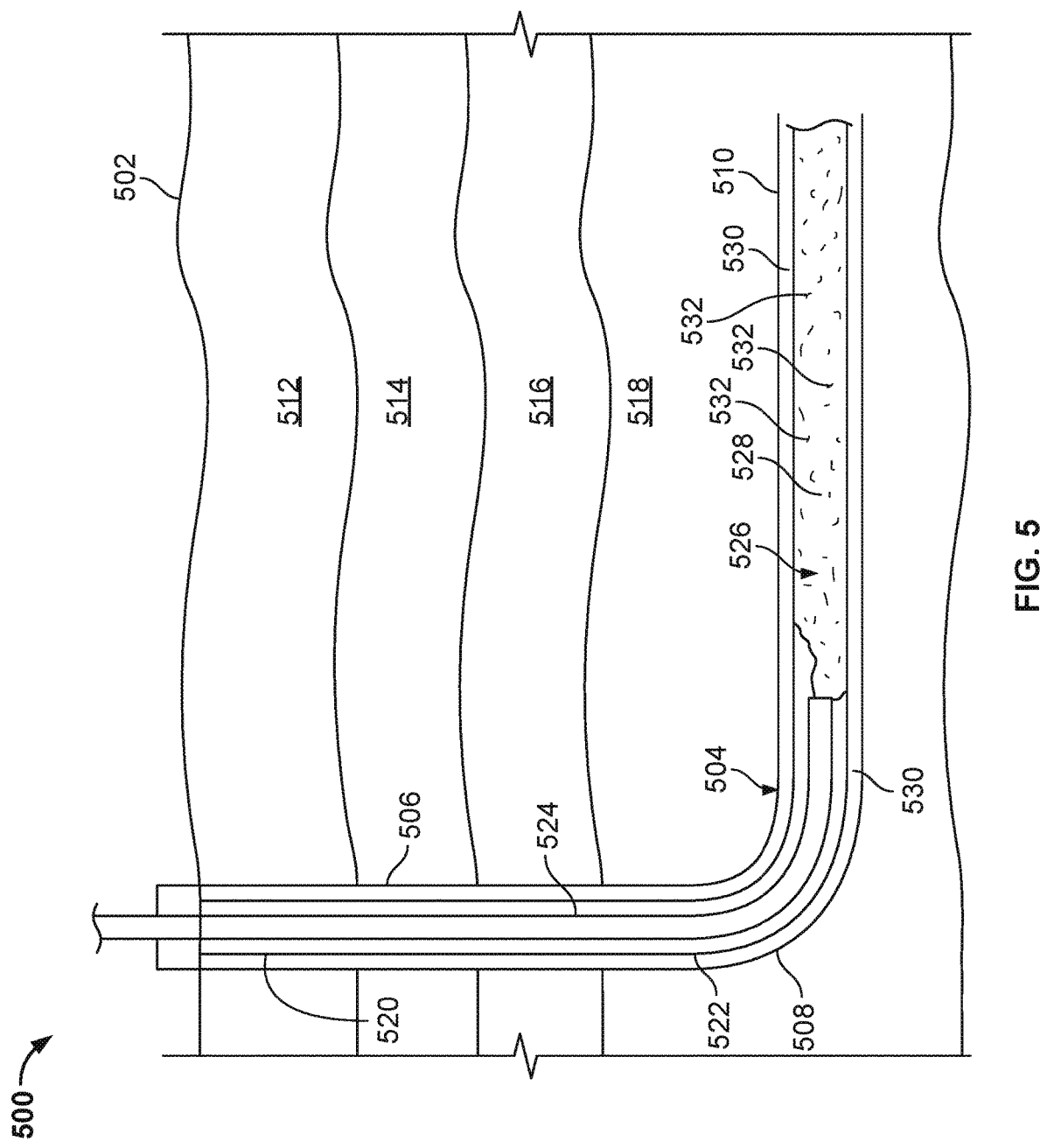
FIG. 5 is a schematic illustration of another example implementation of a hazardous material storage bank system according to the present disclosure.

FIG. 5 is a schematic illustration of another example implementation of a hazardous material storage bank system according to the present disclosure. FIG. 5 illustrates an example implementation of a hazardous material storage bank system 500, which includes hazardous material storage bank system 500 includes a wellbore 504 formed (e.g., drilled or otherwise) from a terranean surface 502 and through multiple subterranean layers 512, 514, 516, and 518. The illustrated wellbore 504 is a directional wellbore in this example of hazardous material storage bank system 500. For instance, the wellbore 504 includes a substantially vertical portion 506 coupled to a radiussed or curved portion 508, which in turn is coupled to a substantially horizontal portion 510.

Generally, such components of the hazardous material storage bank system 500 are substantially the same as similarly-named components of hazardous material storage bank system 100. For example, the illustrated wellbore 504 has a surface casing 520 positioned and set around the wellbore 504 from the terranean surface 502 into a particular depth in the Earth. For example, the surface casing 520 may be a relatively large-diameter tubular member (or string of members) set (e.g., cemented) around the wellbore 504 in a shallow formation. For example, in this implementation of the hazardous material storage bank system 500, the surface casing 520 extends from the terranean surface through a surface layer 512. The surface layer 512, in this example, is a geologic layer comprised of one or more layered rock formations. In some aspects, the surface layer 512 in this example may or may not include freshwater aquifers, salt water or brine sources, or other sources of mobile water (e.g., water that moves through a geologic formation). In some aspects, the surface casing 520 may isolate the wellbore 504 from such mobile water, and may also provide a hanging location for other casing strings to be installed in the wellbore 504. Further, although not shown, a conductor casing may be set above the surface casing 520 (e.g., between the surface casing 520 and the surface 502 and within the surface layer 512) to prevent drilling fluids from escaping into the surface layer 512.

As illustrated, a production casing 522 is positioned and set around the wellbore 504 downhole of the surface casing 520. Although termed a "production" casing, in this example, the casing 522 may or may not have been subject to hydrocarbon production operations. Thus, the casing 522 refers to and includes any form of tubular member that is set (e.g., cemented) in the wellbore 504 downhole of the surface casing 520. In some examples of the hazardous material storage bank system 500, the production casing 522 may begin at an end of the radiussed portion 508 and extend throughout the substantially horizontal portion 510.

As shown, cement 530 is positioned (e.g., pumped) around the casings 520 and 522 in an annulus between the casings 520 and 522 and the wellbore 504. The cement 530, for example, may secure the casings 520 and 522 (and any other casings or liners of the wellbore 504) through the subterranean layers under the terranean surface 502.

As illustrated, the wellbore 504 extends through subterranean layers 512, 514, and 516, and lands in storage layer 518. As discussed above, the surface layer 512 may or may not include mobile water. Subterranean layer 514, which is below the surface layer 512, in this example, is a mobile water layer 514. Below the mobile water layer 514, in this example implementation of hazardous material storage bank system 500, is an impermeable layer 516. The impermeable layer 516, in this example, may not allow mobile water therethrough. Thus, relative to the mobile water layer 514, the impermeable layer 516 may have low permeability, e.g., on the order of nanodarcy permeability. Additionally, in this example, the impermeable layer 516 may be a relatively non-ductile (i.e., brittle) geologic formation. Below the impermeable layer 516 is a storage layer 518. The storage layer 518, in this example, may be chosen as the landing for the substantially horizontal portion 510, which stores the hazardous material, for several reasons. Relative to the impermeable layer 516 or other layers, the storage layer 518 may be thick, e.g., between about 100 and 200 feet of TVD. Thickness of the storage layer 518 may allow for easier landing and directional drilling, thereby allowing the substantially horizontal portion 510 to stay within the storage layer 518 during formation (e.g., drilling). If formed through an approximate horizontal center of the storage layer 518, the substantially horizontal portion 510 may be surrounded by about 50 to 100 feet of the geologic formation that comprises the storage layer 518. Further, the storage layer 518 may also have no mobile water, e.g., due to a very low permeability of the layer 518 (e.g., on the order of milli- or nanodarcys). In addition, the storage layer 518 may have sufficient ductility, such that a brittleness of the rock formation that comprises the layer 518 is between about 3 MPa and 10 MPa. Examples of rock formations of which the storage layer 518 may be composed include: shale and anhydrite.

In some examples implementations of the hazardous material storage bank system 500, the storage layer 518 is composed of shale. Shale, in some examples, may have properties that fit within those described above for the storage layer 518. For example, shale formations may be suitable for a long-term confinement of hazardous material and for their isolation from mobile water layer 514 (e.g., aquifers) and the terranean surface 502. Shale formations may be found relatively deep in the Earth, typically 3000 feet or greater, and placed in isolation below any fresh water aquifers.

Hazardous material storage bank system 500 also includes a work string 524 (e.g., tubing, coiled tubing, wireline, or otherwise) that is extendable through the wellbore 504 to deposit (e.g., pump) a hazardous slurry 526 into a portion of the wellbore 504 (e.g., the substantially horizontal portion 510). The hazardous material slurry 526 comprises a mixture of a hardenable material 528 and hazardous material 532. For example, the hardenable material 528 may be cement, a cementitious material, resin, concrete, adhesive, grout, or other hardenable (e.g., over a known time duration). The hazardous material 532 may be, for example, biological material, chemical material, or nuclear material such as spent nuclear fuel pellets.

In operation, the work string 524 may deposit (e.g., through pumping) the hazardous material slurry 426 in the substantially horizontal portion 510 of the wellbore 504. Over time, the hardenable material 528 in the slurry 526 may harden, thereby substantially trapping and sealing the hazardous material 532 within the hardened slurry and in the wellbore 504. The hazardous material 532 may thus be sealed in the hardened material 528, within the wellbore 504, and within the storage layer 518, providing multiple layers of containment of any output from the hazardous material 532. The hardening time can be set to be short, or it could be set to a longer period (years or decades) to facilitate early retrieval, if it is determined that easier retrieval during the first few years would be advantageous.

Although not shown, once the deposit operation is completed, a seal (e.g., seal 134) may be placed in the wellbore 504 uphole of the hardened slurry. Further, once sealed, a monitoring system (e.g., as shown and described with reference to one or more of FIGS. 2B-2E) may be installed in system 500 to monitor one or more variables associated with the hazardous material 532 (e.g., temperature, radioactivity, water vapor, oxygen, seismic activity, tampering or otherwise).

Figure 6A:
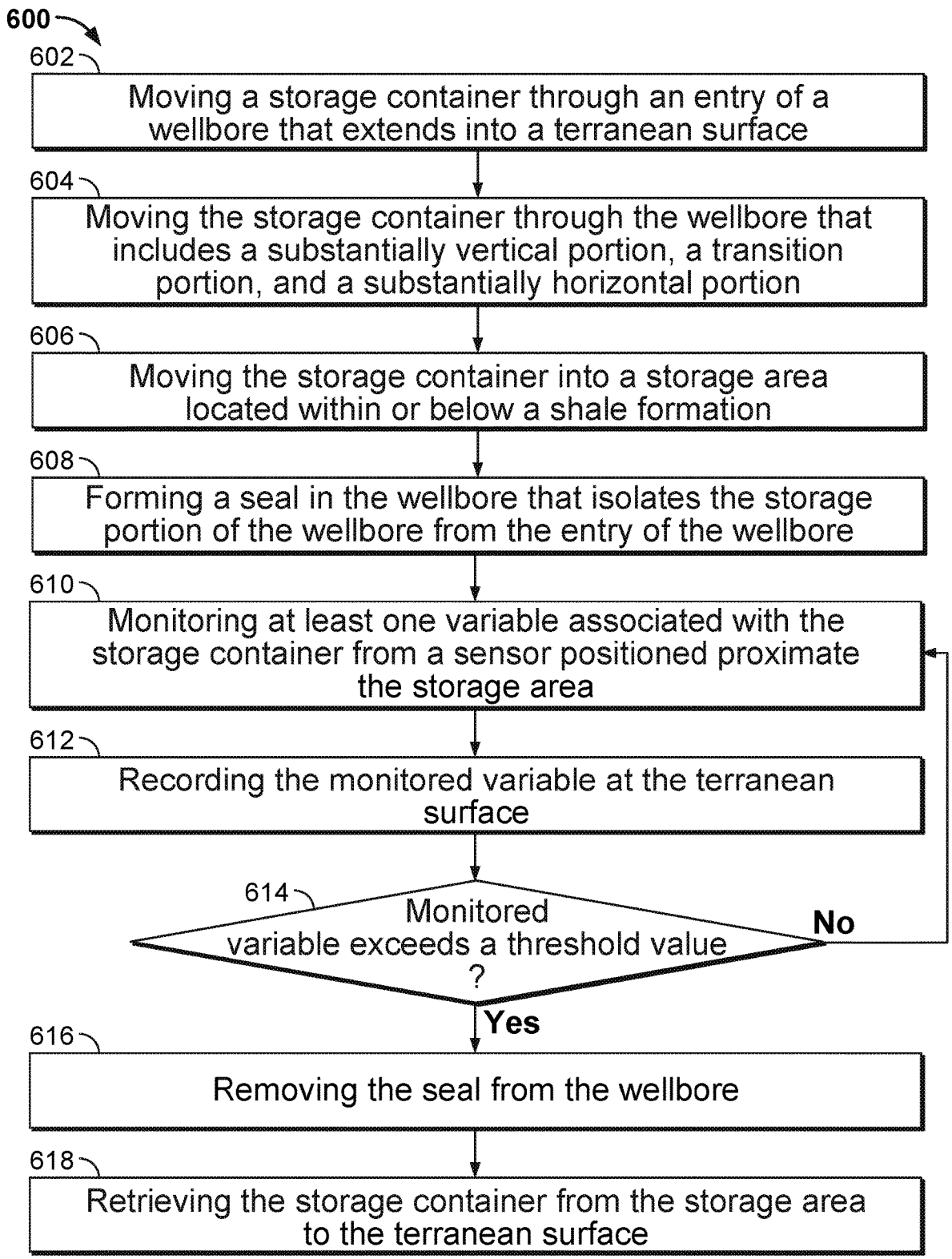
Figure 6C:
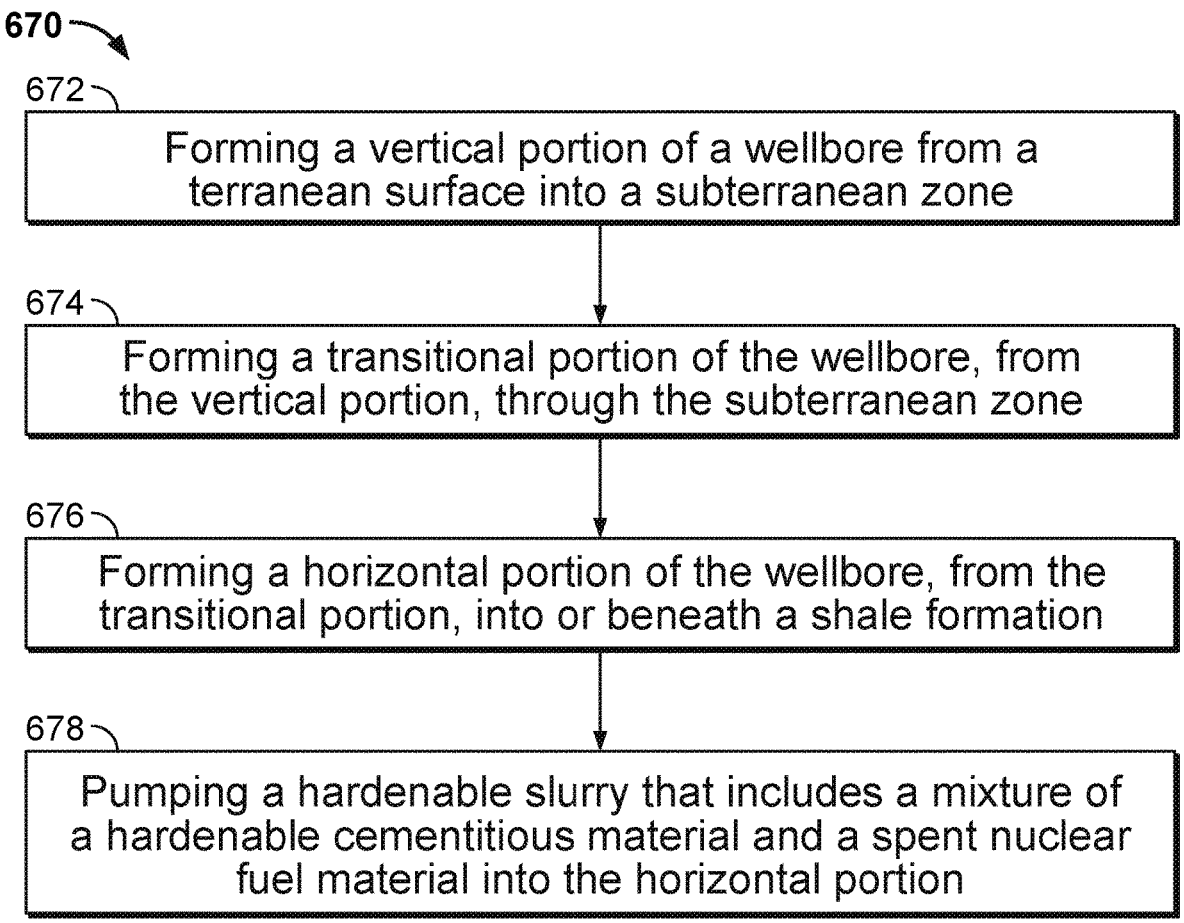

FIGS. 6A-6C are flowcharts that illustrate example methods 600, 640, and 670, respectively, associated with storing hazardous material. Turning to method 600, this example method for storing hazardous material may be performed with or by, e.g., hazardous material storage bank system 100 as described with reference to FIGS. 1A-1B and 2A-2E. Alternatively, method 600 may be performed by another hazardous material storage bank system in accordance with the present disclosure.

Method 600 may begin at step 602, which includes moving a storage container through an entry of a wellbore that extends into a terranean surface. The storage container encloses a hazardous material, such as chemical, biological, or nuclear waste, or another hazardous material. In some aspects, the storage container may be positioned in the entry directly from a mode of transportation (e.g., truck, train, rail, or otherwise) which brought the hazardous material to the site of the wellbore. In some aspects, a packaging of the hazardous material during transport is not removed for movement of the storage container into the entry. In some aspects, such transport packaging is only removed as the storage container fully enters the wellbore.

Method 600 may continue at step 604, which includes moving the storage container through the wellbore that includes a substantially vertical portion, a transition portion, and a substantially horizontal portion. In some aspects, the wellbore is a directional, or slant wellbore. The storage container may be moved through the wellbore in a variety of manners. For example, a tool string (e.g., tubular work string) or wireline may include a downhole tool that couples to the storage container and moves (e.g., pushes) the storage container from the entry to the horizontal portion of the wellbore. As another example, the storage container may ride on rails installed in the wellbore, e.g., a cased wellbore. As yet another example, the storage container may be moved through the wellbore with a wellbore tractor (e.g., motored or powered tractor). In another example, the tractor could be built as part of the storage container. As yet a further example, the storage container may be moved through the wellbore with a fluid (e.g., gas or liquid) circulated through the wellbore.

Method 600 may continue at step 606, which includes moving the storage container into a storage area located within or below a shale formation. For example, the horizontal portion of the wellbore may include or be coupled to the storage area and may be formed through a shale seam within a subterranean zone. In some aspects, the shale may include one or more geologic qualities that provide for a fluidic seal (e.g., gas and liquid) against the escape of any hazardous material beyond the shale formation (e.g., vertically or horizontally). In alternative aspects, the storage area may be formed in the horizontal portion of the wellbore in a rock formation that is not shale, but shares particular geologic characteristics with shale (e.g., anhydrite, and other formations). For example, the rock formation of the storage area may be relatively impermeable, with permeability values less than 0.001 millidarcys (and even down to nanodarcys). As another example, the rock formation may be ductile, having a brittleness of less than about 10 MPa so as to prevent or help prevent fracturing that can allow hazardous material leaks therethrough. Brittleness, as used herein in example implementations, is the ratio of compressive stress of the rock formation to tensile strength of the rock formation. As another example, the rock formation may be relatively thick, with thickness proximate the storage area of between about 100 and 200 feet (although less thick and more thick formations are also contemplated by the present disclosure). As another example, the rock formation may be composed of clay or other organic material, e.g., of about 20-30% weight by volume, to help ductility.

Method 600 may continue at step 608, which includes forming a seal in the wellbore that isolates the storage portion of the wellbore from the entry of the wellbore. For example, once the storage container is moved into the storage area (or after all storage containers are moved into the storage area), a seal may be formed in the wellbore. The seal may be a cement plug, an inflatable seal (e.g., packer), or other seal or combination of such seals. In some aspects, the seal is removable so as to facilitate a subsequent retrieval operation of the storage container.

Method 600 may continue at step 610, which includes monitoring at least one variable associated with the storage container from a sensor positioned proximate the storage area. The variable may include one or more of temperature, radioactivity, seismic activity, oxygen, water vapor, acidity, or other variable that indicates a presence of the hazardous material (e.g., within the wellbore, outside of the storage container, in the rock formation, or otherwise). In some aspects, one or more sensors may be positioned in the wellbore, on or attached to the storage container, within a casing installed in the wellbore, or in the rock formation proximate the wellbore. The sensors, in some aspects, may also be installed in a separate wellbore (e.g., another horizontal or vertical wellbore) apart from the storage area.

Method 600 may continue at step 612, which includes recording the monitored variable at the terranean surface. For example, variable data received at the one or more sensors may be transmitted (e.g., on a conductor or wirelessly) to a monitoring system (e.g., control system 146) at the terranean surface. The monitoring system may perform a variety of operations. For example, the monitoring system may record a history of one or more of the monitored variables. The monitoring system may provide trend analysis in the recorded variable data. As another example, the monitoring system may include one or more threshold limits for each of the monitored variables, and provide an indication when such threshold limits are exceeded.

Method 600 may continue at step 614, which includes determining whether the monitored variable exceeds a threshold value. For example, the one or more sensors may monitor radioactivity in the wellbore, e.g., an amount of radiation released by the hazardous material, whether in alpha or beta particles, gamma rays, x-rays, or neutrons. The sensors, for instance, may determine an amount of radioactivity, in units of measure of curie (Ci) and/or becquerel (Bq), rads, grays (Gy), or other units of radiation. If the amount of radioactivity does not exceed a threshold value that, for example, would indicate a large leak of hazardous nuclear material from the storage container, then the method 600 may return to step 610.

If the determination is "yes," method 600 may continue at step 616, which includes removing the seal from the wellbore. For example, in some aspects, once a threshold value (or values) is exceeded, a retrieval operation may be initiated by removing the seal. In alternative aspects, exceeding of a threshold value may not automatically trigger a retrieval operation or removal of the wellbore seal. In some aspects, there may be multiple monitored variables, and a "yes" determination is only made if all monitored variables exceed their respective threshold values. Alternatively, a "yes" determination may be made if at least one monitored variable exceeds its respective threshold value.

Method 600 may continue at step 618, which includes retrieving the storage container from the storage area to the terranean surface. For example, once the seal is removed (e.g., drilled through or removed to the terranean surface), the work string may be tripped into the wellbore to remove the storage container (or containers) for inspection, repair, or otherwise. In some aspects, rather than removing the seal from the wellbore to retrieve the storage container, other remedial measures may be taken. For example, if the determination is "yes" in step 614, rather than recovering the hazardous material, a decision might be made to improve the seal. This could be done, for example, by injecting a cement or other sealant into the borehole to fill the space previously filled with gas.

Turning to method 640, this example method for storing hazardous material may be performed prior to, for example, method 600. For example, in some aspects, the wellbore into which the storage container is moved in method 400 is formed primarily for the storage of hazardous material. Alternatively, the wellbore may have been formed prior to execution of method 600 and, in some aspects, years or decades prior to execution of method 600. For instance, the wellbore may have been initially formed with a primary purpose of hydrocarbon production.

Method 640 may begin at step 642, which includes forming (e.g., drilling) the wellbore from the terranean surface to the rock formation. In some aspects, the rock formation is shale or other rock formation that includes geologic characteristics suitable for hazardous material storage.

Method 640 may continue at step 644, which includes installing a casing in the wellbore that extends from at or proximate the terranean surface, through at least a portion of the wellbore. In some aspects, the casing may be installed an entire length of the wellbore (e.g., through a vertical portion, a transition portion, and a horizontal or slant portion of the wellbore.

Method 640 may continue at step 646, which includes cementing the casing to the wellbore. In some aspects, the cement may be installed throughout an entire length of the wellbore. Alternatively, only a portion of the casing may be cemented in the wellbore.

Method 640 may continue at step 648, which includes producing hydrocarbon fluid from the rock formation, through the wellbore, and to the terranean surface. In some aspects, the wellbore and casing may first be completed, e.g., perforated and hydraulically fractured, prior to production of hydrocarbon fluids. In some aspects, prior to or subsequent to completing the wellbore, it may be determined that there is insufficient hydrocarbons in the rock formation for economical production.

Method 640 may continue at step 650, which includes shutting in the wellbore. In some aspects, shutting in the wellbore may include cementing the wellbore though at least a portion of its entire length. Thus, in such aspects, prior to step 602 of method 600, the wellbore may be re-formed (e.g., drilled out) to remove the cementing or other seal. In some aspects, step 650 may not be performed, as step 602 from method 600 may be initiated directly after production of hydrocarbons in step 648 is completed.

Turning to method 670, this example method for storing hazardous material may be performed with or by, e.g., hazardous material storage bank system 500 as described with reference to FIG. 5. Alternatively, method 670 may be performed by another hazardous material storage bank system in accordance with the present disclosure.

Method 670 may begin at step 672, which includes forming a vertical portion of a wellbore from a terranean surface into a subterranean zone. Method 670 may continue at step 674, which includes forming a transitional portion of the wellbore, from the vertical portion, through the subterranean zone. Method 670 may continue at step 676, which includes forming a horizontal portion of the wellbore, from the transitional portion, into or beneath a rock formation. The rock formation may be comprised of shale or other rock formation with appropriate geologic characteristics (e.g., permeability, ductility, thickness and/or claim or organic material composition) that evidence a fluid seal between the rock formation and a subterranean layer that includes mobile water. In some alternative aspects, however, the formed wellbore may be a substantially vertical wellbore, with no transition or horizontal portion.

Method 670 may continue at step 678, which includes pumping a hardenable slurry that includes a mixture of a hardenable material and a spent nuclear fuel material into the horizontal portion of the wellbore (or vertical portion if no horizontal portion). The hardenable material may include, for example, a cementitious material, a hardenable resin or epoxy, concrete, grout, or other flowable material that hardens into a solid over a defined period of time. The spent nuclear fuel, e.g., nuclear fuel pellets, may be mixed into the hardenable material such that when the hardenable material hardens, the spent nuclear fuel pellets are rigidly contained in the hardened slurry.

Figure 7:
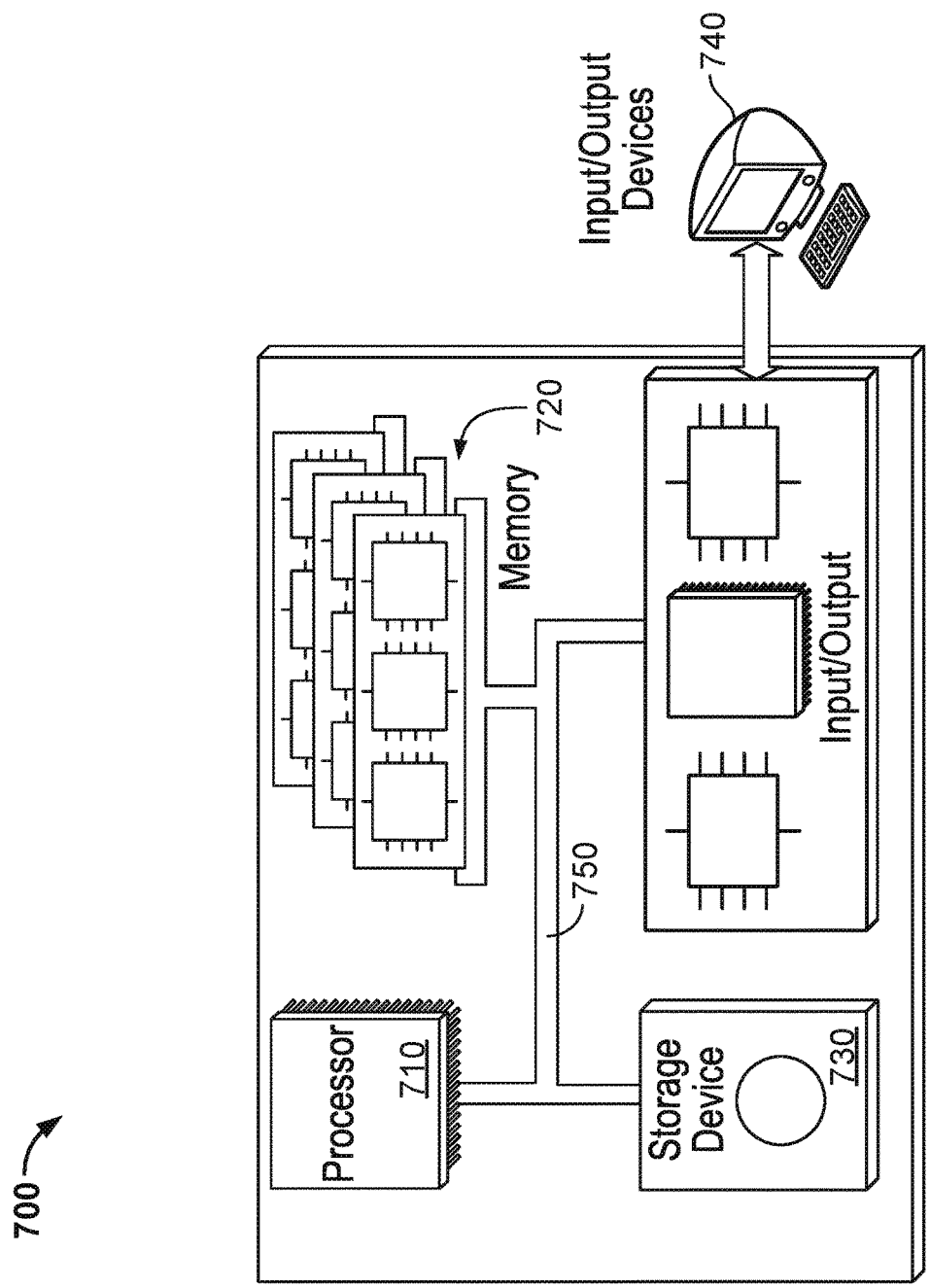
FIG. 7 is a schematic illustration of a controller or control system for monitoring a hazardous material storage bank system according to the present disclosure.

FIG. 7 is a schematic illustration of an example controller 700 (or control system) for an on-board fuel separation system. For example, the controller 700 can be used for the operations described previously, for example as or as part of the monitoring control system 146. For example, the controller 700 may be communicably coupled with, or as a part of, a hazardous material storage bank system as described herein.

The controller 700 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output device 740. Each of the components 710, 720, 730, and 740 are interconnected using a system bus 750. The processor 710 is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the controller 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the controller 700. In one implementation, the storage device 730 is a computer-readable medium. In various different implementations, the storage device 730 may be a floppy disk device, a hard disk device, an optical disk device, a tape device, flash memory, a solid state device (SSD), or a combination thereof.

The input/output device 740 provides input/output operations for the controller 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A subterranean nuclear waste monitoring system, comprising:
a first drillhole extending into the Earth and comprising an entry at least proximate a terranean surface, the first drillhole comprising a vertical portion, a transition portion, a horizontal portion, and a casing installed in at least the horizontal portion of the first drillhole;
a second drillhole extending into the Earth and comprising an entry at least proximate the terranean surface, the second drillhole comprising a vertical portion, a transition portion, and a horizontal portion formed within or adjacent a subterranean formation, where at least the horizontal portion of the second drillhole is separated and decoupled from the horizontal portion of the first drillhole by the subterranean formation and the casing;
a storage area formed in the horizontal portion of the first drillhole, the storage area within or below the subterranean formation;
a storage canister positioned in the storage area, the storage canister sized to fit from the drillhole entry through the vertical portion, the transition portion, and the horizontal portion of the first drillhole, and into the storage area, the storage canister comprising an inner cavity sized to enclose nuclear waste;
a seal positioned in the first drillhole, the seal isolating the storage portion of the drillhole from the entry of the first drillhole;
a hazardous material monitoring assembly comprising:
a plurality of sensors positioned proximate the storage canister in the subterranean formation, at least one sensor of the plurality of sensors positioned in the horizontal portion of the second drillhole and comprising a radioactivity sensor, a seismic sensor, or an acoustic sensor, and
a monitoring control system communicably coupled to the plurality of sensors to receive radioactivity, acoustic, or seismic data from the at least one sensor, wherein
the horizontal portion of the first drillhole is free of the plurality of sensors, and the horizontal portion of the second drillhole is free of nuclear waste.

2. The subterranean nuclear waste monitoring system of claim 1, wherein the plurality of sensors are communicably coupled to the monitoring control system with a cable that extends from the terranean surface into the subterranean formation within the second drillhole.

3. The subterranean nuclear waste monitoring system of claim 2, wherein the cable extends through the seal positioned in the second drillhole.

4. The subterranean nuclear waste monitoring system of claim 1, wherein the casing is further installed in at least a portion of the vertical portion of the first drillhole.

5. The subterranean nuclear waste monitoring system of claim 1, wherein the transition portion of the first drillhole comprises a first transition portion, and the horizontal portion of the first drillhole comprises a first horizontal portion, the system further comprising:
a second transition portion formed from the vertical portion of the first drillhole; and
a second horizontal portion formed from the second transition portion of the first drillhole and extending within or proximate the subterranean formation; and
a second storage area formed in the second horizontal portion of the first drillhole.

6. The subterranean nuclear waste monitoring system of claim 5, wherein the second horizontal portion of the first drillhole is closer to the terranean surface than the first horizontal portion.

7. The subterranean nuclear waste monitoring system of claim 1, wherein at least another of the plurality of sensors comprises at least one of: a temperature sensor, a pressure sensor, an oxygen sensor, a water vapor sensor, a liquid water sensor, or an acidity sensor.

8. The subterranean nuclear waste monitoring system of claim 1, wherein the storage area is vertically isolated, by the subterranean formation, from a subterranean zone that comprises mobile water.

9. The subterranean nuclear waste monitoring system of claim 1, wherein the second drillhole is uncased.

10. The subterranean nuclear waste monitoring system of claim 1, wherein each of the plurality of sensors is positioned on or adjacent the subterranean formation along an axis of the horizontal portion of the second drillhole.

11. The subterranean nuclear waste monitoring system of claim 1, wherein the storage canister comprises one of a plurality of storage canisters positioned in an end-to-end arrangement in the storage area.

12. The subterranean nuclear waste monitoring system of claim 1, wherein the casing comprises a diameter of between 11 inches and 22 inches.

13. A method for monitoring subterranean nuclear waste, comprising:
positioning a plurality of sensors proximate a nuclear waste storage canister in a hazardous waste repository formed in a subterranean formation, where a particular one of the sensors comprises a radioactivity sensor, an acoustic sensor, or a seismic sensor, and the hazardous waste repository comprises:
a first drillhole extending into the Earth and comprising an entry at least proximate a terranean surface, the first drillhole comprising a vertical portion, a transition portion, a horizontal portion, and a casing installed in at least the horizontal portion of the first drillhole;
a second drillhole extending into the Earth and comprising an entry at least proximate the terranean surface, the second drillhole comprising a vertical portion, a transition portion, and a horizontal portion formed within or adjacent the subterranean formation that is separated and decoupled from the horizontal portion of the first drillhole by the subterranean formation and the casing, and the particular one of the sensors is positioned in the horizontal portion of the second drillhole;
a storage area formed in the horizontal portion of the first drillhole, the storage area within or below the subterranean formation, where the horizontal portion of the first drillhole is free of the plurality of sensors, and the horizontal portion of the second drillhole is free of the nuclear waste storage canister; and
a seal positioned in the first drillhole, the seal isolating the storage portion of the first drillhole from the entry of the first drillhole;
measuring radiation, acoustic, or seismic data proximate the nuclear waste storage canister with the particular one of the sensors that is positioned in the horizontal portion of the second drillhole; and
transmitting the measured data to a monitoring control system at or near the terranean surface.

14. The method of claim 13, wherein the plurality of sensors are communicably coupled to the monitoring control system with a cable that extends from the terranean surface into the subterranean formation within the second drillhole.

15. The method of claim 14, wherein the cable extends through the seal positioned in the second drillhole.

16. The method of claim 13, wherein the casing is installed in at least the storage area and the horizontal portion of the first drillhole.

17. The method of claim 13, wherein the transition portion of the first drillhole comprises a first transition portion, and the horizontal portion of the first drillhole comprises a first horizontal portion, the system further comprising:
   a second transition portion formed from the vertical portion of the first drillhole; and
   a second horizontal portion formed from the second transition portion of the first drillhole and extending within or proximate the subterranean formation; and
   a second storage area formed in the second horizontal portion of the first drillhole.

18. The method of claim 17, wherein the second horizontal portion of the first drillhole is closer to the terranean surface than the first horizontal portion.

19. The method of claim 13, wherein at least another of the plurality of sensors comprises at least one of: a temperature sensor, a pressure sensor, an oxygen sensor, a water vapor sensor, a liquid water sensor, or an acidity sensor.

20. The method of claim 13, wherein the storage area is vertically isolated, by the subterranean formation, from a subterranean zone that comprises mobile water.

21. The method of claim 13, wherein the second drillhole is uncased.

22. The method of claim 13, wherein each of the plurality of sensors is positioned on or adjacent the subterranean formation along an axis of the horizontal portion of the second drillhole.

23. The method of claim 13, wherein the storage canister comprises one of a plurality of storage canisters positioned in an end-to-end arrangement in the storage area.

24. The method of claim 13, further comprising" measuring, with another sensor of the plurality of sensors, at least one of: a temperature, a pressure, an oxygen level, a water vapor level, a liquid water level, or an acidity proximate the nuclear waste storage canister.

25. The method of claim 13, further comprising:
   determining, with the monitoring control system, that the measured level of radiation exceeds a particular threshold of radiation proximate the nuclear waste storage canister.

26. The method of claim 25, further comprising:
   based on the determination, selecting, with the monitoring control system, an action; and
   recommending, with the monitoring control system, the action.

27. The method of claim 26, wherein the action comprises retrieval of the nuclear waste canister from either of the first drillhole of the second drillhole toward the terranean surface.

28. The method of claim 13, further comprising transmitting the measured level of radiation from the monitoring control system located at the drillhole to a remote monitoring location.

29. The method of claim 13, further comprising:
   recording, with the monitoring control system, a plurality of measurements of the level of radiation over a time duration; and
   determining, with the monitoring control system, a radiation level trend based on the plurality of measurements of the level of radiation over the time duration.

30. The method of claim 29, further comprising:
   based on the trend, selecting, with the monitoring control system, an action; and
   recommending, with the monitoring control system, the action.

* * * * *

UNITED STATES PATENT AND TRADEMARK OFFICE
CERTIFICATE OF CORRECTION

PATENT NO. : 10,614,927 B2  
APPLICATION NO. : 16/430005  
DATED : April 7, 2020  
INVENTOR(S) : Richard A. Muller and Elizabeth Muller Page 1 of 1

It is certified that error appears in the above-identified patent and that said Letters Patent is hereby corrected as shown below:

On the Title Page

Column 2, item (57), Abstract, Line 6, delete "well bore," and insert -- wellbore, --, therefor.

In the Claims

Column 30, Line 1, Claim 24, delete "comprising"" and insert -- comprising --, therefor.

Signed and Sealed this  
Seventh Day of July, 2020

Andrei Iancu  
*Director of the United States Patent and Trademark Office*